(12) United States Patent
Mesheryakov et al.

(10) Patent No.: US 9,984,071 B2
(45) Date of Patent: May 29, 2018

(54) LANGUAGE AMBIGUITY DETECTION OF TEXT

(71) Applicant: ABBYY PRODUCTION LLC, Moscow (RU)

(72) Inventors: Dmitry Konstantinovich Mesheryakov, Moscow (RU); Vladimir Pavlovich Selegey, Moscow (RU)

(73) Assignee: ABBYY PRODUCTION LLC, Moscow (RU)

(*) Notice: Subject to any disclaimer, the term of this patent is extended or adjusted under 35 U.S.C. 154(b) by 177 days.

(21) Appl. No.: 14/509,438

(22) Filed: Oct. 8, 2014

(65) Prior Publication Data
US 2015/0057991 A1    Feb. 26, 2015

Related U.S. Application Data

(63) Continuation-in-part of application No. 13/477,021, filed on May 21, 2012, now Pat. No. 9,817,818, (Continued)

(30) Foreign Application Priority Data

Dec. 25, 2013    (RU) .............................. 2013157757

(51) Int. Cl.
*G06F 17/28*    (2006.01)
*G06F 17/27*    (2006.01)

(52) U.S. Cl.
CPC ............ *G06F 17/28* (2013.01); *G06F 17/271* (2013.01); *G06F 17/2755* (2013.01); *G06F 17/2785* (2013.01); *G06F 17/2881* (2013.01)

(58) Field of Classification Search
None
See application file for complete search history.

(56) References Cited

U.S. PATENT DOCUMENTS 4,706,212 A    11/1987  Toma
5,068,789 A    11/1991  Van Vliembergen
(Continued)

OTHER PUBLICATIONS

Hutchins, "Machine Translation: past, present, future", (Ellis Horwood Series in Computers and their Applications) Ellis Horwood: Chichester, 1986, 382 pp., ISBN 0-85312-788-3.*
(Continued)

*Primary Examiner* — Richa Mishra
(74) *Attorney, Agent, or Firm* — Lowenstein Sandler LLP

(57) ABSTRACT

Disclosed are systems, computer-readable mediums, and methods for detecting language ambiguity. A sentence is analyzed to determine syntactic relationships among generalized constituents of the sentence. A graph of the generalized constituents is formed based on syntactic relationships and a lexical-morphological structure of the sentence. The graph is analyzed to determine a plurality of syntactic structures of the sentence. Each syntactic structure is rated on its probability that the syntactic structure is an accurate hypothesis about a full syntactic structure of the sentence. Semantic structures corresponding to the syntactic structures are determined. A first semantic structure and a second semantic structure of the semantic structures are selected, where the first and second semantic structures are different and each have a corresponding syntactic structure having a rating of at least a threshold value. A semantic ambiguity in the sentence is determined based on a difference between the first and second semantic structures.

17 Claims, 23 Drawing Sheets

Related U.S. Application Data which is a continuation of application No. 11/690,102, filed on Mar. 22, 2007, now Pat. No. 8,195,447, which is a continuation-in-part of application No. 11/548,214, filed on Oct. 10, 2006, now Pat. No. 8,078,450.

(60) Provisional application No. 60/888,057, filed on Feb. 2, 2007.

(56) References Cited

U.S. PATENT DOCUMENTS

| | | | |
|---|---|---|---|
| 5,099,425 A * | 3/1992 | Kanno | G06F 17/274 704/9 |
| 5,146,405 A | 5/1992 | Church | |
| 5,128,865 A | 7/1992 | Sadler | |
| 5,175,684 A | 12/1992 | Chong | |
| 5,386,556 A | 1/1995 | Courts et al. | |
| 5,418,717 A | 5/1995 | Su et al. | |
| 5,426,583 A | 6/1995 | Uribe-Echebarria Diaz De Mendibi | |
| 5,475,587 A | 12/1995 | Anick et al. | |
| 5,477,451 A | 12/1995 | Brown et al. | |
| 5,490,061 A | 2/1996 | Tolin et al. | |
| 5,497,319 A | 3/1996 | Chong et al. | |
| 5,510,981 A | 4/1996 | Berger et al. | |
| 5,550,934 A | 8/1996 | Van Vliembergen et al. | |
| 5,559,693 A | 9/1996 | Anick et al. | |
| 5,677,835 A | 10/1997 | Carbonnell et al. | |
| 5,696,980 A | 12/1997 | Brew | |
| 5,715,468 A | 2/1998 | Budzinski | |
| 5,721,938 A | 2/1998 | Stuckey | |
| 5,724,593 A | 3/1998 | Hargrave et al. | |
| 5,737,617 A | 4/1998 | Bernth et al. | |
| 5,768,603 A | 6/1998 | Brown et al. | |
| 5,784,489 A | 7/1998 | Van Vliembergen et al. | |
| 5,794,050 A | 8/1998 | Dahlgren et al. | |
| 5,794,177 A | 8/1998 | Carus et al. | |
| 5,826,219 A | 10/1998 | Kutsumi | |
| 5,826,220 A | 10/1998 | Takeda et al. | |
| 5,848,385 A | 12/1998 | Poznanski et al. | |
| 5,873,056 A | 2/1999 | Liddy et al. | |
| 5,884,247 A | 3/1999 | Christy | |
| 6,223,150 B1 | 4/2001 | Duan et al. | |
| 6,233,544 B1 | 5/2001 | Alshawi | |
| 6,243,669 B1 | 6/2001 | Horiguchi | |
| 6,243,670 B1 | 6/2001 | Bessho et al. | |
| 6,243,689 B1 | 6/2001 | Norton | |
| 6,260,008 B1 | 7/2001 | Sanfilippo | |
| 6,266,642 B1 | 7/2001 | Franz et al. | |
| 6,275,789 B1 | 8/2001 | Moser et al. | |
| 6,278,967 B1 | 8/2001 | Akers et al. | |
| 6,282,507 B1 | 8/2001 | Horiguchi et al. | |
| 6,285,978 B1 | 9/2001 | Bernth et al. | |
| 6,330,530 B1 | 12/2001 | Horiguchi et al. | |
| 6,356,864 B1 | 3/2002 | Foltz et al. | |
| 6,356,865 B1 | 3/2002 | Franz et al. | |
| 6,393,389 B1 | 5/2002 | Chanod et al. | |
| 6,463,404 B1 * | 10/2002 | Appleby | G06F 17/2785 704/2 |
| 6,470,306 B1 | 10/2002 | Pringle et al. | |
| 6,622,123 B1 | 9/2003 | Chanod et al. | |
| 6,658,627 B1 | 12/2003 | Gallup et al. | |
| 6,760,695 B1 | 7/2004 | Kuno et al. | |
| 6,721,697 B1 | 8/2004 | Duan et al. | |
| 6,778,949 B2 | 8/2004 | Duan et al. | |
| 6,871,174 B1 | 3/2005 | Dolan et al. | |
| 6,871,199 B1 | 3/2005 | Binnig et al. | |
| 6,901,399 B1 | 5/2005 | Corston et al. | |
| 6,901,402 B1 | 5/2005 | Corston-Oliver et al. | |
| 6,928,448 B1 | 8/2005 | Franz et al. | |
| 6,937,974 B1 | 8/2005 | D'Agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 6,986,104 B2 | 1/2006 | Green et al. | |
| 7,013,264 B2 | 3/2006 | Dolan et al. | |
| 7,020,601 B1 | 3/2006 | Hummel et al. | |
| 7,027,974 B1 | 4/2006 | Busch et al. | |
| 7,050,964 B2 | 5/2006 | Menzes et al. | |
| 7,085,708 B2 | 8/2006 | Manson et al. | |
| 7,167,824 B2 | 1/2007 | Kallulli | |
| 7,191,115 B2 | 3/2007 | Moore | |
| 7,269,594 B2 | 9/2007 | Corston-Oliver et al. | |
| 7,346,493 B2 | 3/2008 | Ringger et al. | |
| 7,356,457 B2 | 4/2008 | Pinkham et al. | |
| 7,389,225 B1 * | 6/2008 | Jensen | G06F 17/2785 704/4 |
| 7,475,015 B2 | 1/2009 | Epstein et al. | |
| 7,739,102 B2 | 6/2010 | Bender | |
| 2001/0014902 A1 | 8/2001 | Hu et al. | |
| 2001/0029455 A1 | 10/2001 | Chin et al. | |
| 2002/0040292 A1 | 8/2002 | Marcu | |
| 2003/0158723 A1 | 8/2003 | Masuichi et al. | |
| 2003/0176999 A1 | 9/2003 | Calcagno et al. | |
| 2003/0182102 A1 | 9/2003 | Corston-Oliver et al. | |
| 2003/0204392 A1 | 10/2003 | Finnigan et al. | |
| 2004/0098247 A1 | 5/2004 | Moore | |
| 2004/0122656 A1 | 6/2004 | Abir | |
| 2004/0172235 A1 | 9/2004 | Pinkham et al. | |
| 2004/0193401 A1 | 9/2004 | Ringger et al. | |
| 2004/0213455 A1 * | 10/2004 | Lossev | G06K 9/222 382/159 |
| 2004/0254781 A1 | 12/2004 | Appleby | |
| 2005/0010421 A1 | 1/2005 | Watanabe et al. | |
| 2005/0015240 A1 | 1/2005 | Appleby | |
| 2005/0075859 A1 * | 4/2005 | Ramsey | G06F 17/2715 704/9 |
| 2005/0086047 A1 | 4/2005 | Uchimoto et al. | |
| 2005/0137853 A1 | 6/2005 | Appleby et al. | |
| 2005/0155017 A1 | 7/2005 | Berstis et al. | |
| 2005/0080613 A1 | 8/2005 | Colledge et al. | |
| 2005/0171757 A1 | 8/2005 | Appleby | |
| 2005/0209844 A1 | 9/2005 | Wu et al. | |
| 2005/0220351 A1 * | 10/2005 | Vanderwende | G06F 17/30734 382/229 |
| 2006/0004563 A1 | 1/2006 | Campbell et al. | |
| 2006/0004653 A1 | 1/2006 | Strongin | |
| 2006/0080079 A1 | 4/2006 | Yamabana | |
| 2006/0095250 A1 | 5/2006 | Chen et al. | |
| 2006/0217963 A1 * | 9/2006 | Masuichi | G06F 17/2836 704/7 |
| 2006/0217964 A1 | 9/2006 | Kamatani et al. | |
| 2006/0224378 A1 | 10/2006 | Chino et al. | |
| 2006/0293876 A1 | 12/2006 | Kamatani et al. | |
| 2007/0010990 A1 | 1/2007 | Woo | |
| 2007/0016398 A1 | 1/2007 | Buchholz | |
| 2007/0083359 A1 | 4/2007 | Bender | |
| 2007/0100601 A1 | 5/2007 | Kimura | |

OTHER PUBLICATIONS

Pado, "Cross-linguistic Projection of Role—Semantic Information", Date Oct. 6, 2005, Association for Computational Linguistics Stroudsburg, PA, USA © 2005 URL: http://jair.org/media/2863/live-2863-4721-jair.pdf.*

Bolshakov, "Co-Ordinative Ellipsis in Russian Texts: Problems of Description and Restoration", Published in: Proceeding Coling '88 Proceedings of the 12th conference on Computational linguistics—vol. 1 doi>10.3115/991635.991649, 1988, 65-67.

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

* cited by examiner

| 2201 | 2202 | 2203 | 2204 | 2205 2206 | 2207 | 2208 | 2209 | 2210 2211 | 2212 |
|---|---|---|---|---|---|---|---|---|---|
| This | child | is | smart | he' | = | do | well | in | life . |
| this <Pronoun, GTNoun, PersonThird> | child <Noun, Nominative \| Accusative, GTNoun, Singular> | be <Verb, GTVerb, Singular, PersonThird, ZeroType, Present, Nonnegative, NoCompositeness> | smart <Adjective, DegreePositive, GTAdjectiveAttr, FullComparison> | he <Pronoun, Nominative \| Accusative, GTNoun, Masculine, Singular, PersonThird, RCPersonal, Unreflexive> | shall <Verb, GTVerbModal, ZeroType, Present, Nonnegative, Composite_ll> | do <Noun, Nominative \| Accusative, GTNoun, Singular> | well <Adjective, DegreePositive, GTAdjectiveAttr, FullComparison> | in <Adverb, GTAdverb> | life <Adjective, DegreePositive, GTAdjectiveAttr> |
| this <Invariable> | | be <Verb, GTVerb, Singular, PersonThird, ZeroType, Present, Nonnegative, Regular, Composite_for_t> | smart <Verb, GTVerb, Singular, PersonFirst \| PersonSecond, ZeroType, Present, Nonnegative, NoCompositeness> | | will <Verb, GTVerbModal, ZeroType, Present, Nonnegative, Irregular, Composite_ll> | do <Verb, GTVerb, Plural, ZeroType, Present, Nonnegative, NoCompositeness> | well <Adjective, GTAdjectivePredic> | in <Preposition> | |
| this <Pronoun, GTAdjectiveAttr, Singular, RCDemonstrative> | | | smart <Verb, GTVerb, Plural, ZeroType, Present, Nonnegative, NoCompositeness> | | | do <Verb, GTVerb, Singular, PersonFirst \| PersonSecond, ZeroType, Present, Nonnegative, NoCompositeness> | well <Verb, GTVerb, Singular, PersonFirst \| PersonSecond, ZeroType, Present, Nonnegative, NoCompositeness> | | life <Noun, Nominative \| Accusative, GTNoun, Singular> |
| | | | smart <Verb, GTInfinitive, NumberZero, PersonZero, ZeroType, TenseZero, Nonnegative> | | | do <Verb, GTInfinitive, NumberZero, PersonZero, ZeroType, TenseZero, Nonnegative> | well <Verb, GTVerb, Plural, ZeroType, Present, Nonnegative, NoCompositeness> | | |
| | | | smart <Adverb, DegreePositive, GTAdverb, FullComparison> | | | | well <Verb, GTInfinitive, NumberZero, PersonZero, ZeroType, TenseZero, Nonnegative> | | |
| | | | smart <Noun, Nominative \| Accusative, GTNoun, Singular> | | | | well <Invariable \| Prefixoid> | | |
| | | | | | | | well <Adverb, DegreePositive, GTAdverb, FullComparison> | | |
| | | | | | | | well <Noun, Nominative \| Accusative, GTNoun, Singular> | | |

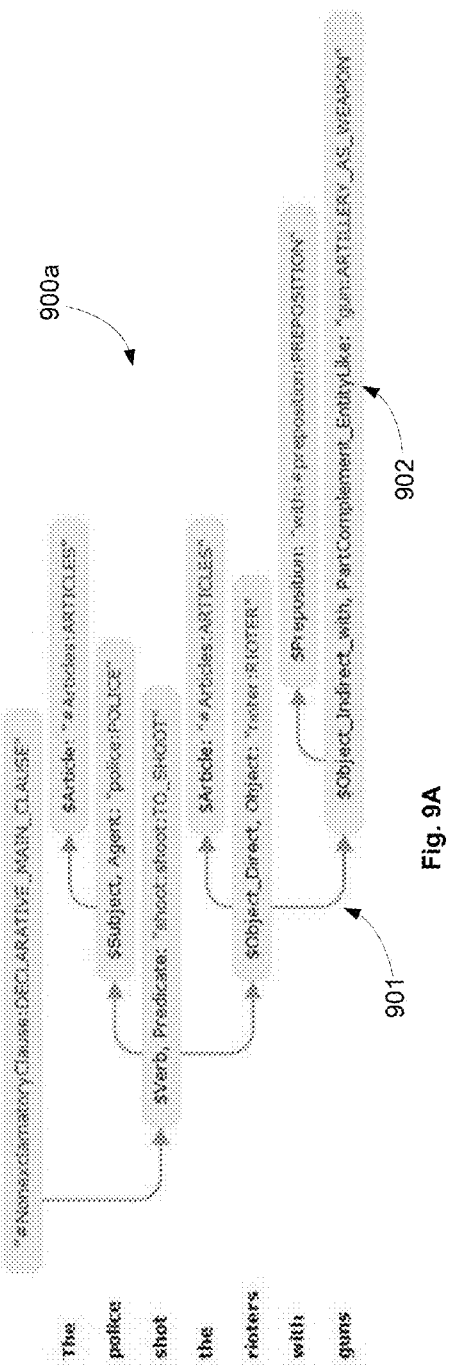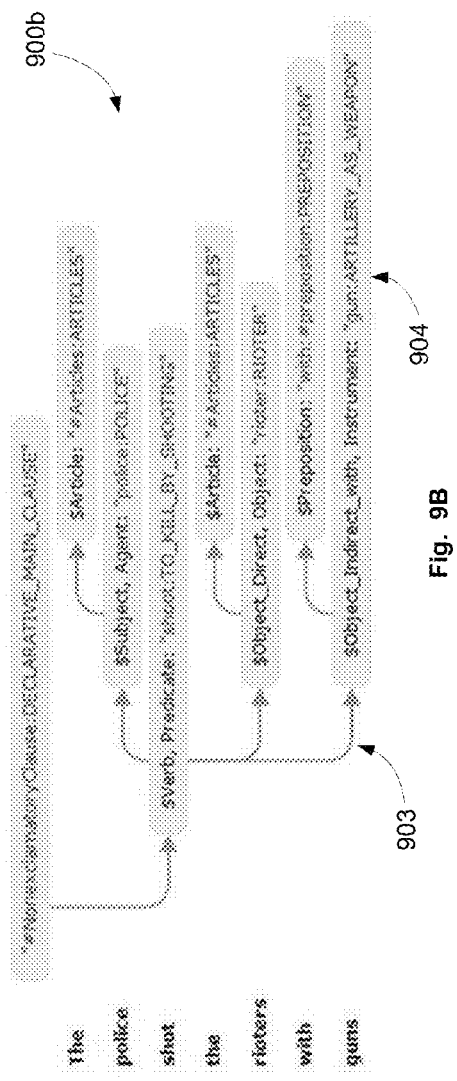
Fig. 9A
Fig. 9B

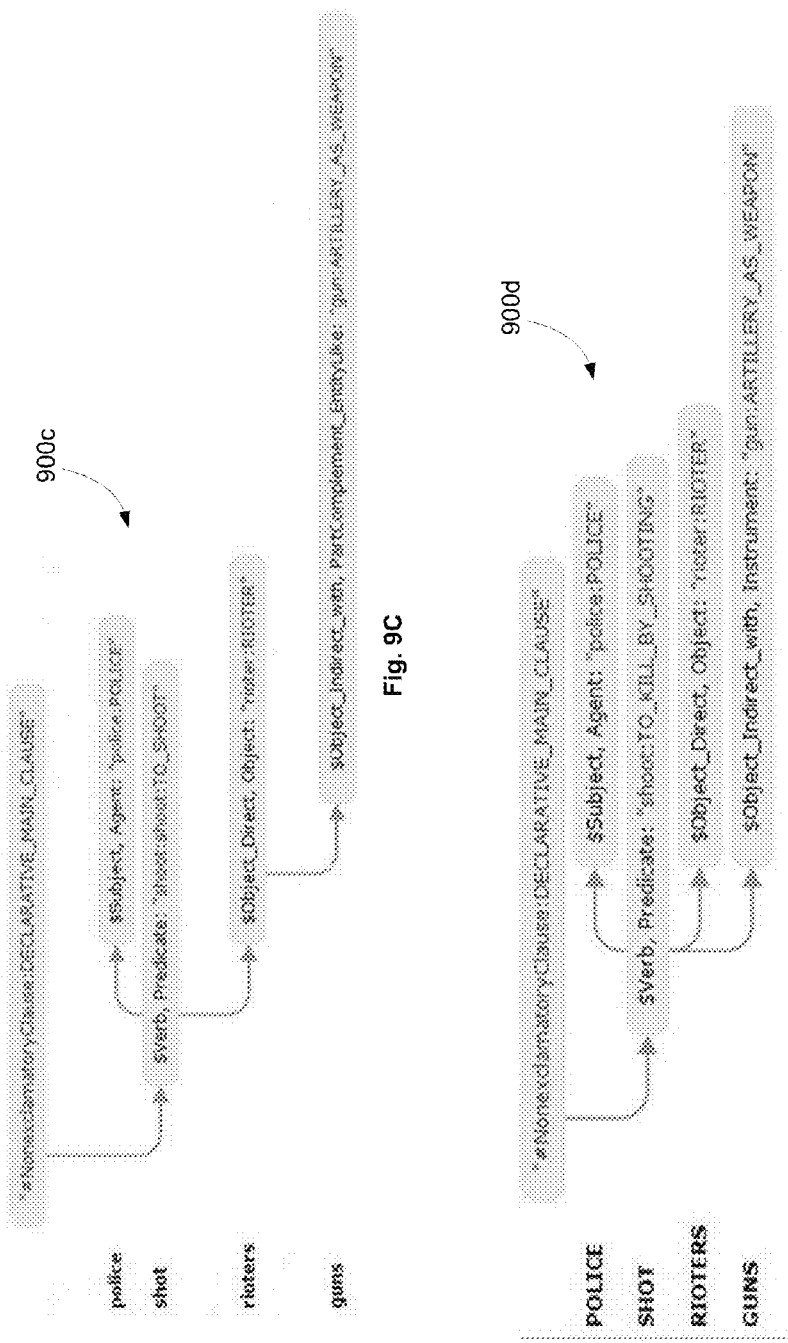

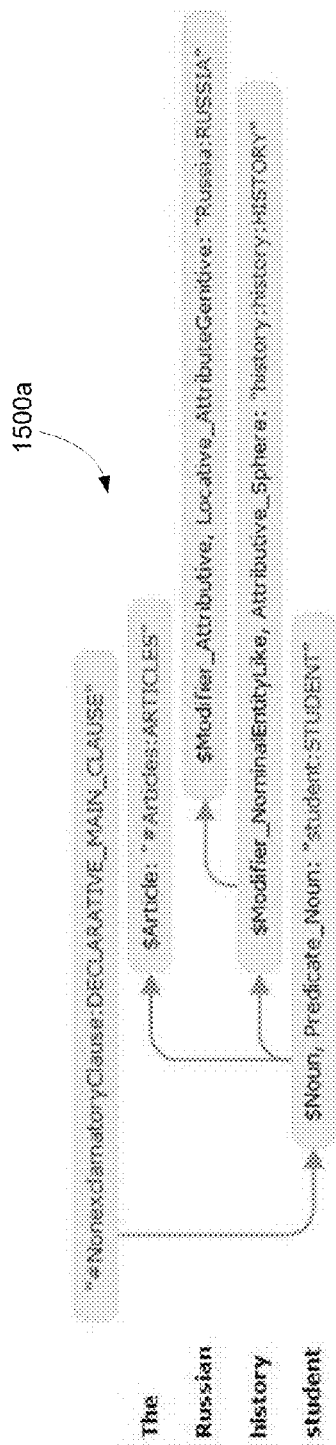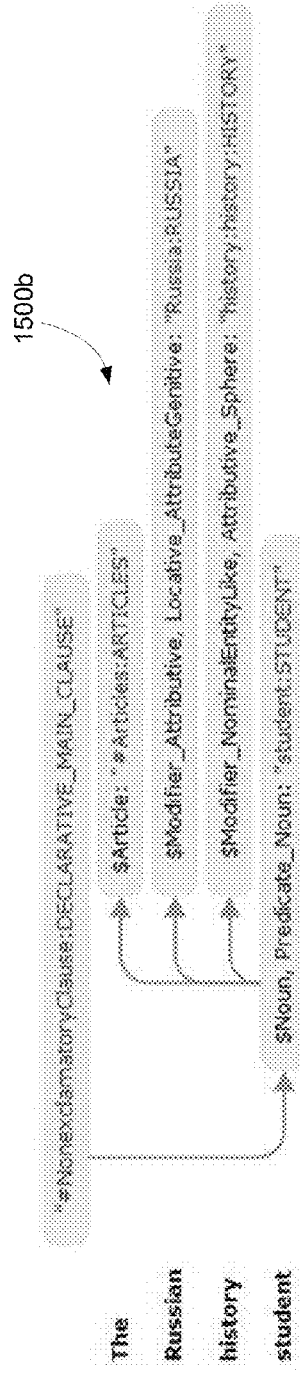
Fig. 15A
Fig. 15B

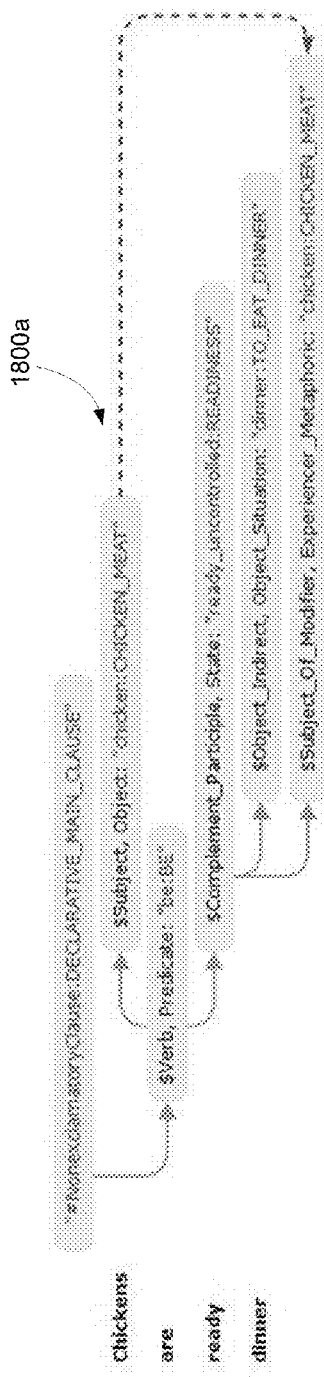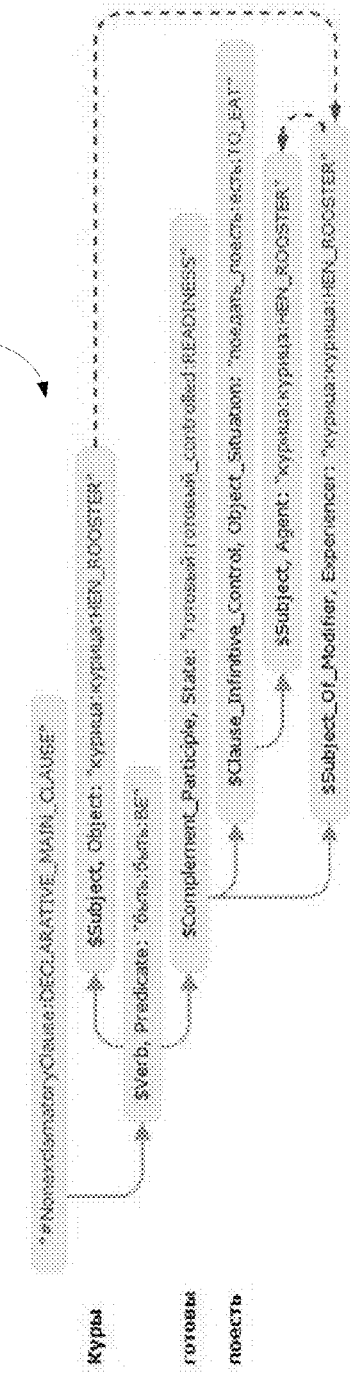
Fig. 18A
Fig. 18B

LANGUAGE AMBIGUITY DETECTION OF TEXT

CROSS REFERENCE TO RELATED APPLICATIONS

This application is a Continuation-In-Part of the U.S. application Ser. No. 13/477,021, filed May 21, 2013 which is a Continuation of U.S. application Ser. No. 11/690,102, filed Mar. 3, 2007, now U.S. Pat. No. 8,195,447, issued Jun. 5, 2012. This application is a Continuation-In-Part of U.S. application Ser. No. 11/548,214, filed Oct. 10, 2006, now U.S. Pat. No. 8,078,450, issued Dec. 13, 2011. This application claims the benefit of priority to U.S. Provisional Application No. 60/888,057, filed Feb. 2, 2007. This application also claims the benefit of priority under 35 USC 119 to Russian Patent Application No. 2013157757, filed Dec. 25, 2013; the disclosures of the priority applications are incorporated herein by reference.

BACKGROUND

Frequently in compiling documents, particularly in two or more languages, phrases with several interpretations may be found. Because of this, an ambiguity may exist in the interpretation of a phrase. Currently, compiled documents are often verified entirely by hand in an effort to avoid any ambiguity. There are also a number of articles and handbooks containing rules and recommendations about how to correctly write and compile documents, including court and other legal documents, in order to avoid ambiguity in interpretation. This is because the wrong interpretation of documents may have negative consequences. These articles and handbooks typically contain a formal set of rules to follow. One of the best ways to verify ambiguity in a document is to have the document checked by several people independently. However, for a number of reasons, checking for ambiguity in this manner is performed carelessly or unprofessionally. One of the reasons might be that the person checking the document might not have sufficient qualifications as a philologist to find the ambiguous phrases and sentences. In addition, this task is very labor-intensive for people who are not native speakers, because finding ambiguity requires an in-depth knowledge of the language, its lexicon, its syntactic and morphological rules, its exceptions and other features. Additionally, bringing in highly qualified professional native speakers with philology training is often an expensive step that is not always available to a company or person.

SUMMARY

Described herein systems, computer-readable mediums, and methods for providing language ambiguity detection in a text. An illustrative method includes analyzing, using one or more processors, a sentence of a first text to determine syntactic relationships among generalized constituents of the sentence, forming a graph of the generalized constituents of the sentence based on the syntactic relationships and a lexical-morphological structure of the sentence, analyzing the graph to determine a plurality of syntactic structures of the sentence, and rating each of the plurality of syntactic structures, wherein a rating represents a probability that a syntactic structure is an accurate hypothesis about a full syntactic structure of the sentence. The method further includes determining semantic structures corresponding to the syntactic structures and selecting a first semantic structure from the semantic structures and a second semantic structure from the semantic structures, wherein the first and second semantic structures each have a corresponding syntactic structure having a rating of at least a threshold value, and wherein the first semantic structure is different than the second semantic structure. The method further includes determining a semantic ambiguity in the sentence based on a difference between the first and second semantic structures.

An illustrative system includes one or more processors configured to analyze a sentence of a first text to determine syntactic relationships among generalized constituents of the sentence, form a graph of the generalized constituents of the sentence based on the syntactic relationships and a lexical-morphological structure of the sentence, analyze the graph to determine a plurality of syntactic structures of the sentence, and rate each of the plurality of syntactic structures, wherein a rating represents a probability that a syntactic structure is an accurate hypothesis about a full syntactic structure of the sentence. The one or more processors are further configured to determine semantic structures corresponding to the syntactic structures and select a first semantic structure from the semantic structures and a second semantic structure from the semantic structures, wherein the first and second semantic structures each have a corresponding syntactic structure having a rating of at least a threshold value, and wherein the first semantic structure is different than the second semantic structure. The one or more processors are further configured to determine a semantic ambiguity in the sentence based on a difference between the first and second semantic structures.

An illustrative non-transitory computer-readable medium has instructions stored thereon, the instructions include instructions to analyze a sentence of a first text to determine syntactic relationships among generalized constituents of the sentence, instructions to form a graph of the generalized constituents of the sentence based on the syntactic relationships and a lexical-morphological structure of the sentence, instructions to analyze the graph to determine a plurality of syntactic structures of the sentence, and instructions to rate each of the plurality of syntactic structures, wherein a rating represents a probability that a syntactic structure is an accurate hypothesis about a full syntactic structure of the sentence. The instructions further include instructions to determine semantic structures corresponding to the syntactic structures and instructions to select a first semantic structure from the semantic structures and a second semantic structure from the semantic structures, wherein the first and second semantic structures each have a corresponding syntactic structure having a rating of at least a threshold value, and wherein the first semantic structure is different than the second semantic structure. The instructions further include instructions to determine a semantic ambiguity in the sentence based on a difference between the first and second semantic structures.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 2A shows a diagram of an example of the lexical-morphological structure for the English sentence "The child is smart, he'll do well in life" in accordance with an illustrative embodiment of the disclosure.

FIGS. 9A, 9B, 9C and 9D show diagrams of syntactic and semantic structures for the sentence "The police shot rioters with guns" in accordance with an illustrative embodiment of the disclosure.

FIGS. 15A, 15B, 15C, and 15D show diagrams of a syntactic tree produced as a result of precise syntactic analysis of the English phrase "The Russian history student" in accordance with an illustrative embodiment of the disclosure.

FIGS. 18A and 18B show diagrams of semantic trees produced by analyzing the sentence "Chickens are ready for dinner" and Russian sentence "Куры готовы поесть " in accordance with an illustrative embodiment of the disclosure.

Figure 1:
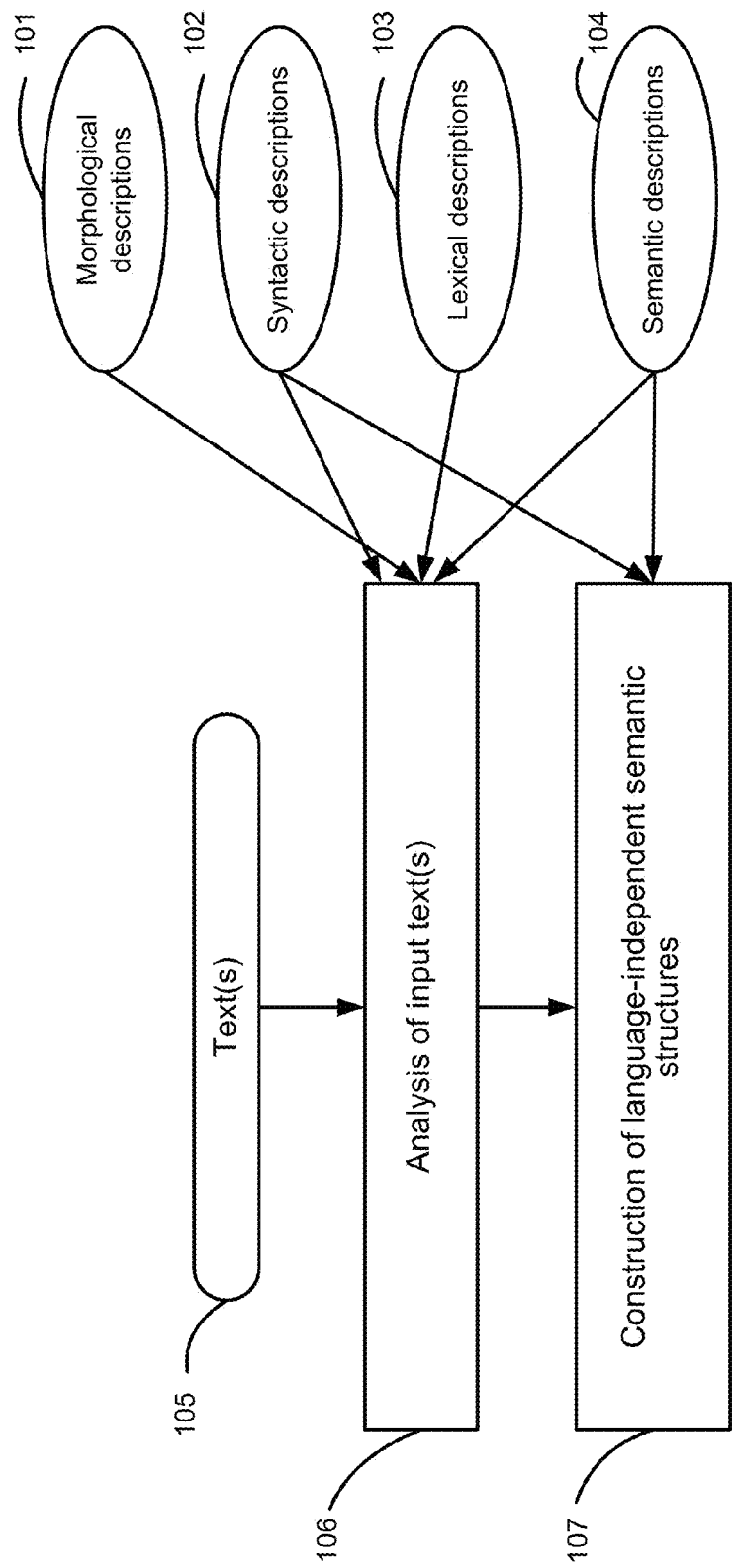
FIG. 1 shows a flowchart of operations for performing deep analysis in accordance with an illustrative embodiment of the disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Implementations of various disclosed embodiments relate to finding meanings of sentences in texts including through the use of a semantic hierarchy.

This invention provides systems, computer-readable mediums, and methods for checking text for ambiguous sentences. A user may obtain the result of this automated check after is has been performed as described herein. For example, a result can be provided in the form of various visual signals, etc. The user may be given the opportunity to look at an identified ambiguity and various ways of interpreting a sentence having the ambiguity. In addition, the user can make a detailed examination of the semantic structures formed for the sentence containing the ambiguity and can manually check the results provided by the disclosed invention.

For example, a situation may arise in which the parties to a signed legal agreement interpret the agreement's terms and conditions differently due to ambiguities in the text of the agreement. The natural language analysis system of this invention can automatically find and extract ambiguous phrases or assertions in the agreement that could be treated in two or more possible ways. Thus, the invention mitigates human factor issues that might otherwise arise, for example, if the agreement is checked by hand by lawyers from both parties to the document. Furthermore, this system can be used in machine translation and present a user with several alternative translations for sentences with several interpretations, or may be used to check the accuracy of the results of a machine translation. Additionally, this invention can check parallel texts (text corpora) as to whether they have been aligned correctly. This is particularly useful when obtaining parallel texts from outside sources and checking of their manual alignment, translation databases, and so forth.

The disclosed embodiments may find and resolve semantic ambiguity in texts (text corpora). The invention may make use of syntactic analysis based on the exhaustive linguistic descriptions shown in U.S. Pat. No. 8,078,450. Because such analysis is based on language-independent semantic structures, the disclose embodiments similarly do not depend on a particular language either. As such, the embodiments can be implemented with one or more natural languages.

As mentioned, U.S. Pat. No. 8,078,450 describes a method that includes deep syntactic and semantic analysis of natural language texts based on exhaustive linguistic descriptions. This technology may be used to find ambiguity in the text. The method uses a broad spectrum of linguistic descriptions, both universal semantic mechanisms and those associated with the specific language, which allows the real complexities of the language to be reflected without simplification or artificial limits, and without danger of an unmanageable increase in complexity. In addition, the analysis methods are based on principles of cohesive goal-oriented recognition. In other words, hypotheses about the structure of a portion of a sentence are verified as part of checking the hypotheses about the structure of the entire sentence. This makes it possible to avoid analyzing a large set of anomalies and variations.

Figure 2:
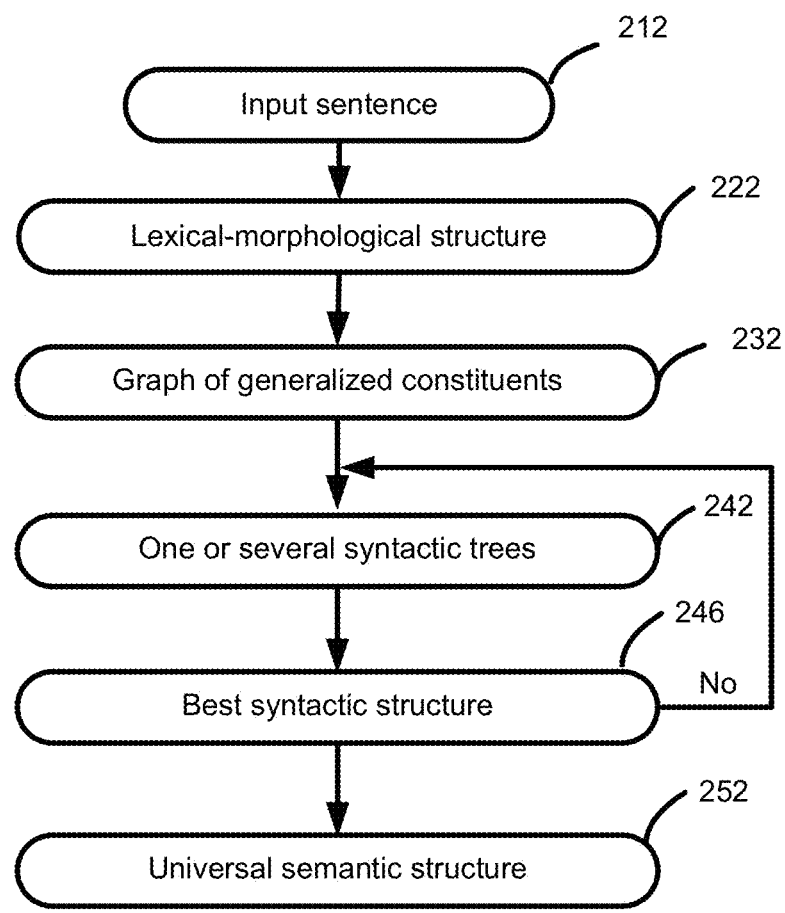
FIG. 2 shows a flowchart of the sequence of structures formed during analysis of a sentence in accordance with an illustrative embodiment of the disclosure.

Deep analysis includes lexical-morphological, syntactic and semantic analysis of each sentence of the text corpus, resulting in construction of language-independent semantic structures in which each word of text is assigned to a corresponding semantic class. Referring to FIG. 1, a flowchart of operations for performing deep analysis is shown. The text (105) is subjected to semantic-syntactic analysis (106) with the use of linguistic descriptions for the source language and for universal semantic descriptions, which makes it possible to analyze not only the surface syntactic structure but also the deep semantic structure that expresses the meaning in the statement contained in each sentence and the relationships between sentences or text ranges. Linguistic descriptions may include morphological descriptions (101), syntactic descriptions (102), lexical descriptions (103), and semantic descriptions (104). The analysis (106) includes a syntactic analysis done as a two-stage algorithm (rough syntactic analysis and precise syntactic analysis) using linguistic models and information at various levels to compute probabilities and generate a set of syntactic structures. FIG. 2 shows a sequence of structures formed during analysis of a sentence. FIGS. 2 and 2A will be described in further detail below.

Rough Syntactic Analysis

Figure 3:
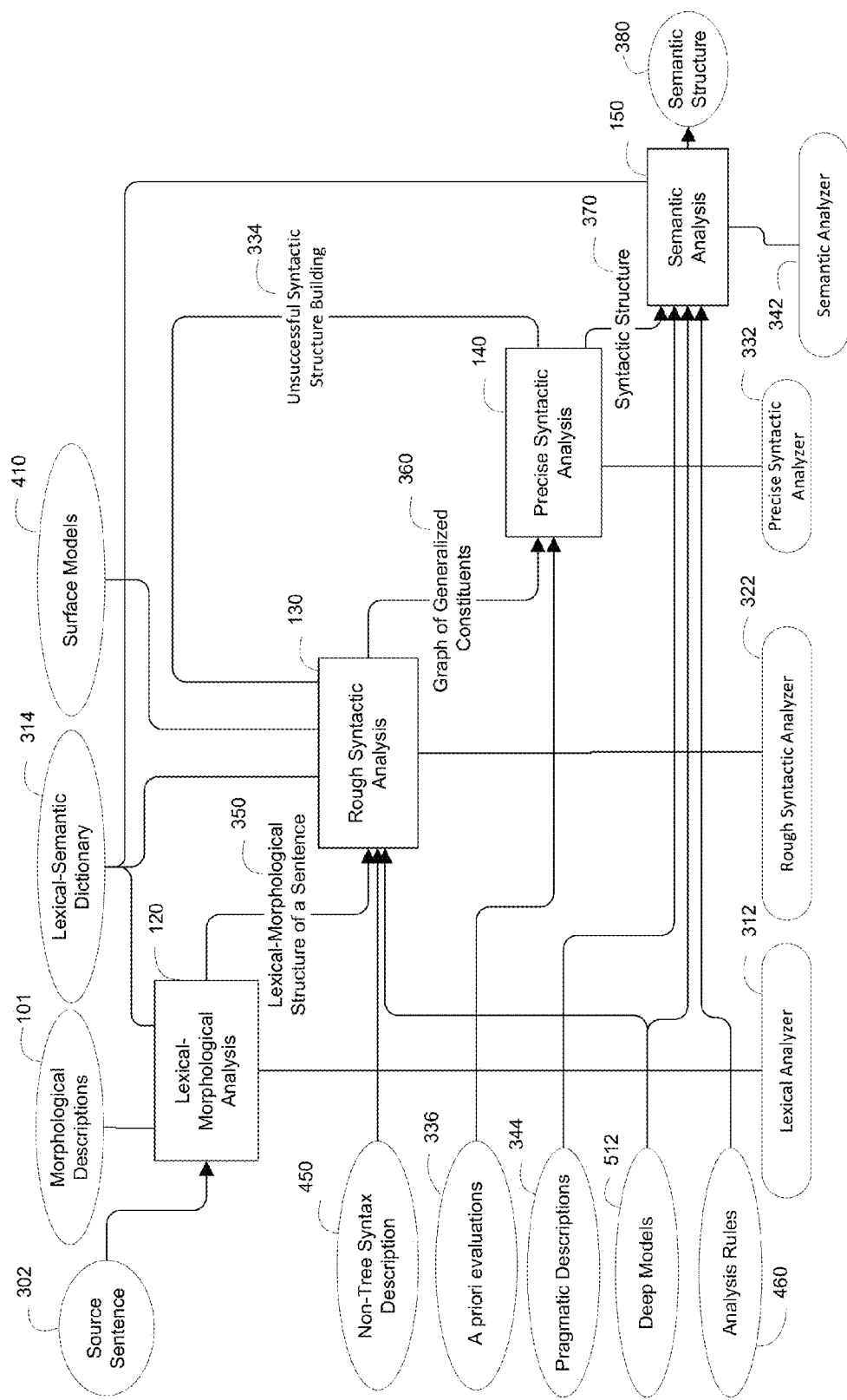
FIG. 3 shows a diagram in accordance with an illustrative embodiment of the disclosure.

FIG. 3 shows a chart corresponding to numeral 106 of FIG. 1, and includes a rough syntactic analyzer (322) used to show possible syntactic relationships in the sentence, which is expressed in creating a graph of generalized constituents (360) based on lexical-morphological analysis (120) performed (by a lexical analyzer (312)) on the lexical-morphological structure (350) with the use of surface models (410), deep models (512) and a lexical-semantic dictionary (314). The graph of generalized constituents (360) is an acyclic graph in which the nodes are generalized (meaning that they store all the alternatives) lexical values for words in the sentence, and the edges are surface (syntactic) slots expressing various types of relationships between the combined lexical values. All of the possible surface syntactic models for each element of the lexical-morphological structure of the sentence as a potential core for the constituents are used. Then all the possible constituents are built and generalized into a graph of generalized constituents (232). Consequently, all the possible syntactic descriptions and syntactic structures for the source sentence (302) are examined and a graph of generalized constituents (360) based on a set of generalized constituents is constructed as a result. The graph of generalized constituents (360) at the surface model level reflects all the possible relationships between words of the source sentence (302). Because the number of variations of a syntactic parsing can be large in the general case, the graph of generalized constituents (360) is excessive and has a great number of variations—both for selecting the lexical value for the vertex (nodes) and for the surface slots for the graph edges.

Figure 4:
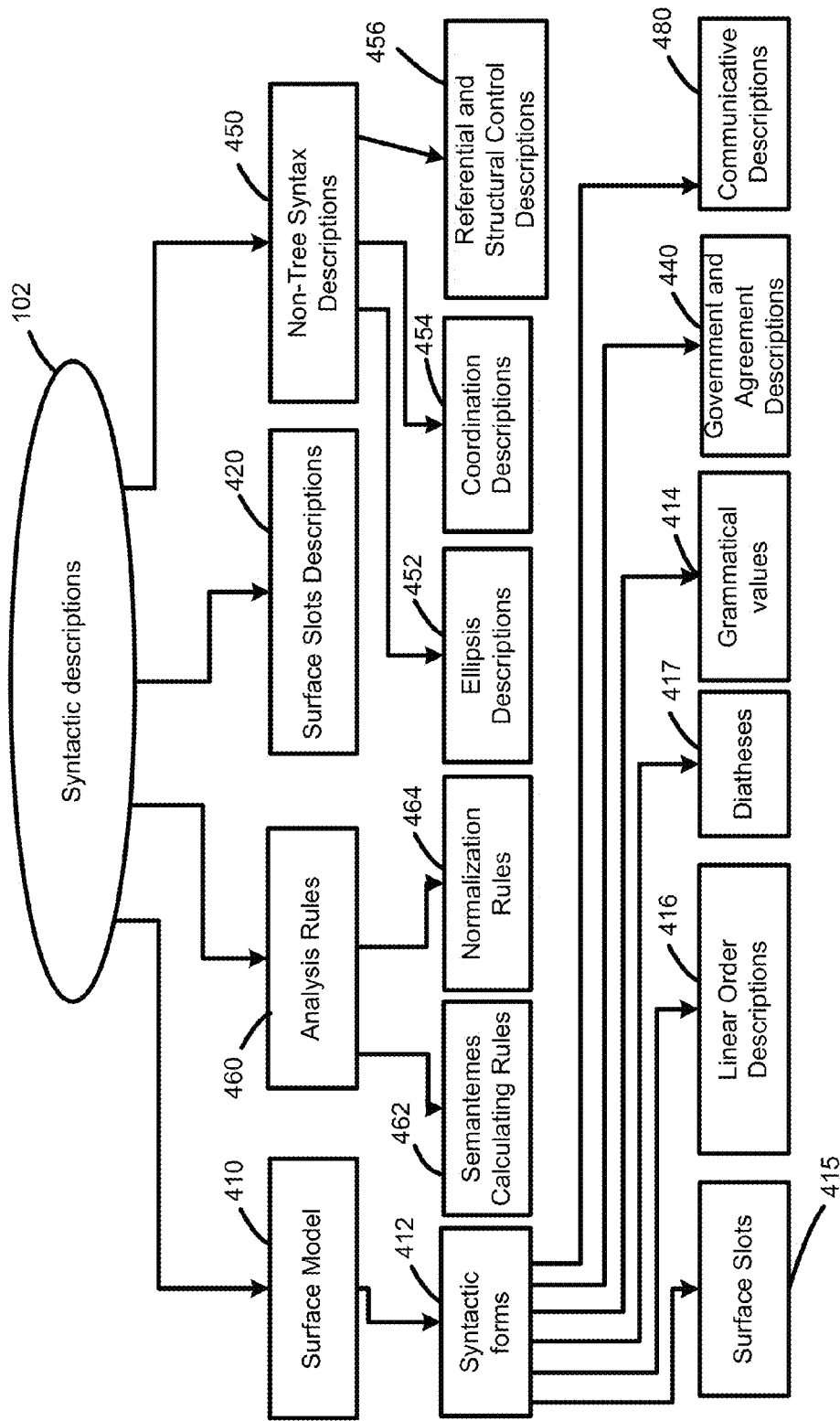
FIG. 4 shows a diagram of syntactic descriptions in accordance with an illustrative embodiment of the disclosure.

For each pair of "lexical meaning-grammatical value," the surface model is initialized, and other constituents are added in the surface slots (415) of the syntform (syntactic form) (412) of its surface model (410) and the neighboring constituents on the left and on the right. The syntactic descriptions are shown in FIG. 4. If an appropriate syntactic form is found in the surface model (410) for the corresponding lexical value, the selected lexical value may be used as the core for a new constituent.

In an illustrative embodiment, the graph of generalized constituents (360) is initially constructed as a tree (although other structures may be used), starting from the leaves and continuing to the root (bottom to top/bottom up). Additional constituents may be produced from bottom to top by attaching child constituents to parent constituents by filling surface slots (415) of the parent constituents in order to cover all the initial lexical units of the source sentence (302).

In an illustrative embodiment, the root of the tree is the main clause and is a special constituent corresponding to various types of maximal units of a text analysis (such as complete sentences, enumeration, titles, etc.). The core of the main clause is generally a predicate. In practice, the tree becomes a graph, because the lower-level constituents (leaves) may be included in various upper-level constituents (root).

Some constituents that are constructed for the same constituents of the lexical-morphological structure may be later generalized in order to produce generalized constituents. Constituents are generalized based on lexical values (1312 of FIG. 13) or grammatical values (414), such as those based on parts of speech, by their boundaries, among others. Constituents are generalized by boundaries (links) because there are a number of different syntactic relationships in a sentence and the same word may be included in several different constituents. As the result of rough syntactic analysis (130), a graph of generalized constituents (360) is constructed and represents the entire sentence as a whole.

Figure 5:
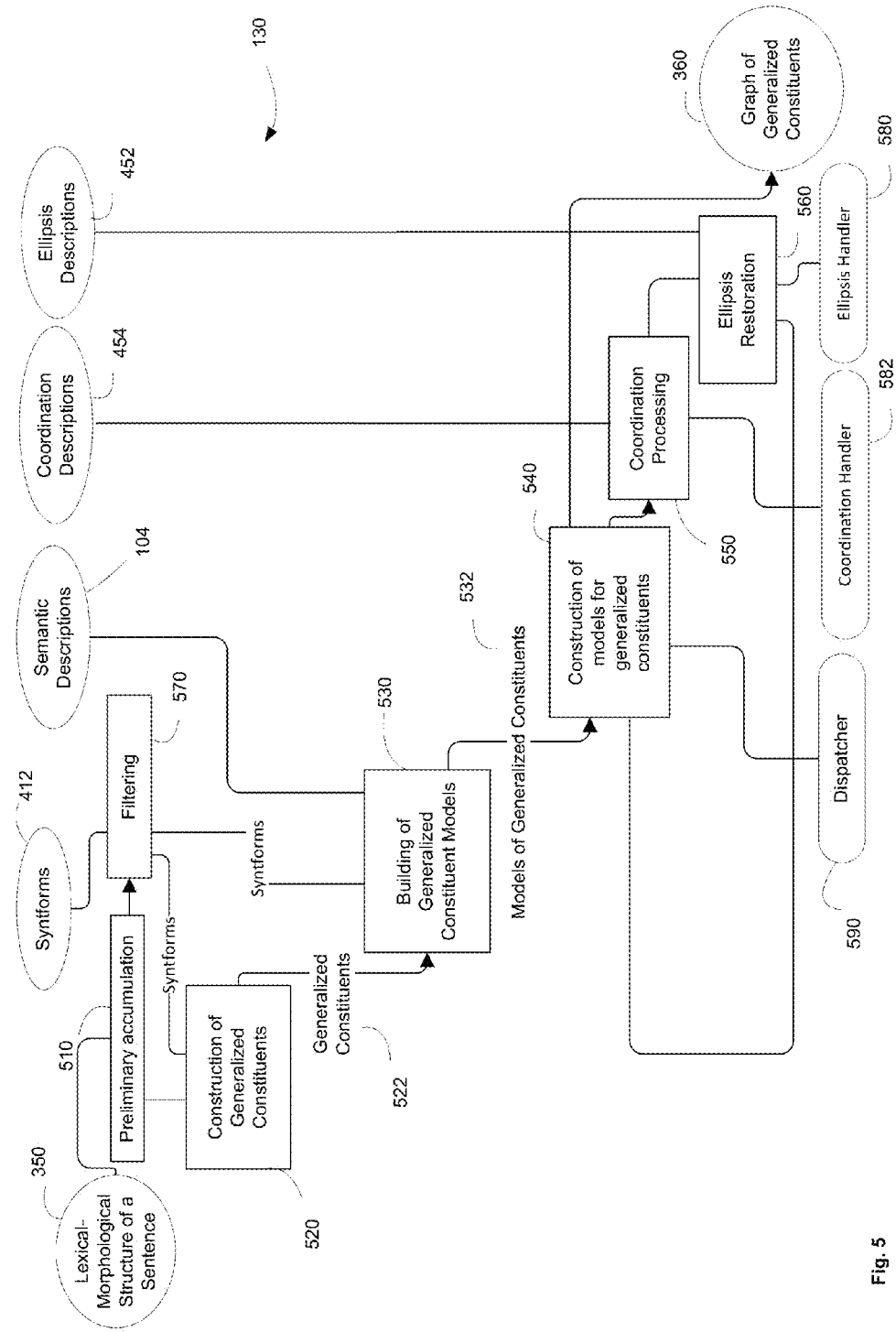
FIG. 5 shows a diagram of rough syntactic analysis in accordance with an illustrative embodiment of the disclosure.

FIG. 5 shows the process of rough syntactic analysis (130) in accordance with one or more embodiments of the invention. Rough syntactic analysis (130) generally includes a preliminary assembly (510) of constituents, construction (building) of generalized constituents (520), filtration (170), construction of models for generalized constituents (540), coordination processing (550), and ellipses (560), among others.

In an illustrative embodiment, the preliminary assembly (510) of constituents during the rough syntactic analysis stage (130) is based on the lexical-morphological structure (350) of the sentence analyzed, including certain word groups, words in brackets, quotation marks, and similar items. Only one word in the group (the core of the constituent) can attach or be attached to a constituent from outside the group. The preliminary assembly (510) is done at the beginning of rough syntactic analysis (130) before the generalized constituents (520) and the generalized constituent models (530) are constructed to cover all the boundaries of the whole sentence. During rough syntactic analysis (130), the number of different constituents that can be constructed and the number of syntactic relationships among them can be very large. Some of these surface models (410) of constituents are chosen to sort them out during the filtration process (570) prior to and after constructing the constituents in order to significantly reduce the number of constituents that need to be considered. Therefore, at the initial (early) stage of rough syntactic analysis (130), the most suitable surface models and syntforms are selected based on the a priori rating. Such prior rough ratings include rating of lexical values, rating of items filling slots (fillers), and rating of semantic descriptions, among others. The filtering (570) at the rough syntactic analysis stage (130)

includes filtering of a set of syntactic forms (syntforms) (412) and is done in advance, prior to constructing generalized constituents, and also while constructing generalized constituents (520). Syntforms (412) and surface slots (415) are filtered in advance (a priori), but the constituents are not filtered until after they have already been constructed. The filtering process (570) distills out and substantially reduces the number of alternative breakdowns examined. However, there are low-probability alternative meanings, surface models and syntforms, and excluding them from subsequent consideration may lead to a loss of a less-probable, but still possible meanings.

When all the possible constituents have been constructed, the generalization procedure for constructing generalized constituents is executed (520). All the possible homonyms and all the possible meanings for the elements of the source sentence which are capable of being present in the same part of speech are condensed and generalized, and all the possible constituents constructed this way are condensed into generalized constituents (522).

In an illustrative embodiment, a generalized constituent (522) describes all the constituents with all the possible boundaries in a given source sentence which have a word form as the core constituents and various lexical meanings of this word form. Then the generalized constituent models (530) are constructed and a set of generalized constituent models (532) is constructed with generalized models of all the generalized lexemes. Models of the generalized constituent lexemes contain a generalized deep model and a generalized surface model. A generalized deep model for lexemes includes a list of all the deep slots that have the same lexical meaning for a lexeme, along with descriptions of all the requirements for items that fill (filler) the deep slots. A generalized surface model may contain information about the syntforms (412) that may contain a lexeme, about surface slots (415), about the diatheses (417) (the correspondence between the surface slots (415) and the deep slots (1214)), and a description of the linear order (416).

The diathesis (417) is constructed at the rough syntactic analysis stage (130) as a correspondence between the generalized surface models and the generalized deep models. The list of all possible semantic classes for all diatheses (417) of a lexeme is compiled for each surface slot (415).

As shown in FIG. 5, the information from the syntform (412) of the syntactic description (102), like the semantic descriptions (104), is used to construct generalized constituent models (532). For example, dependent constituents are attached to each lexical value (1312) and rough syntactic analysis (130) is needed to establish whether a candidate for being a constituent or a dependent constituent may fill the corresponding deep slot in the semantic description (104) for the core constituent. Such a compatibility analysis makes it possible to sever bad syntactic relationships at an early stage.

A graph of generalized constituents (540) is then constructed. A graph of generalized constituents (360) describing all possible syntactic structures for the entire sentence is constructed using an assembly of the generalized constituents (522) and the links among them.

Figure 6:
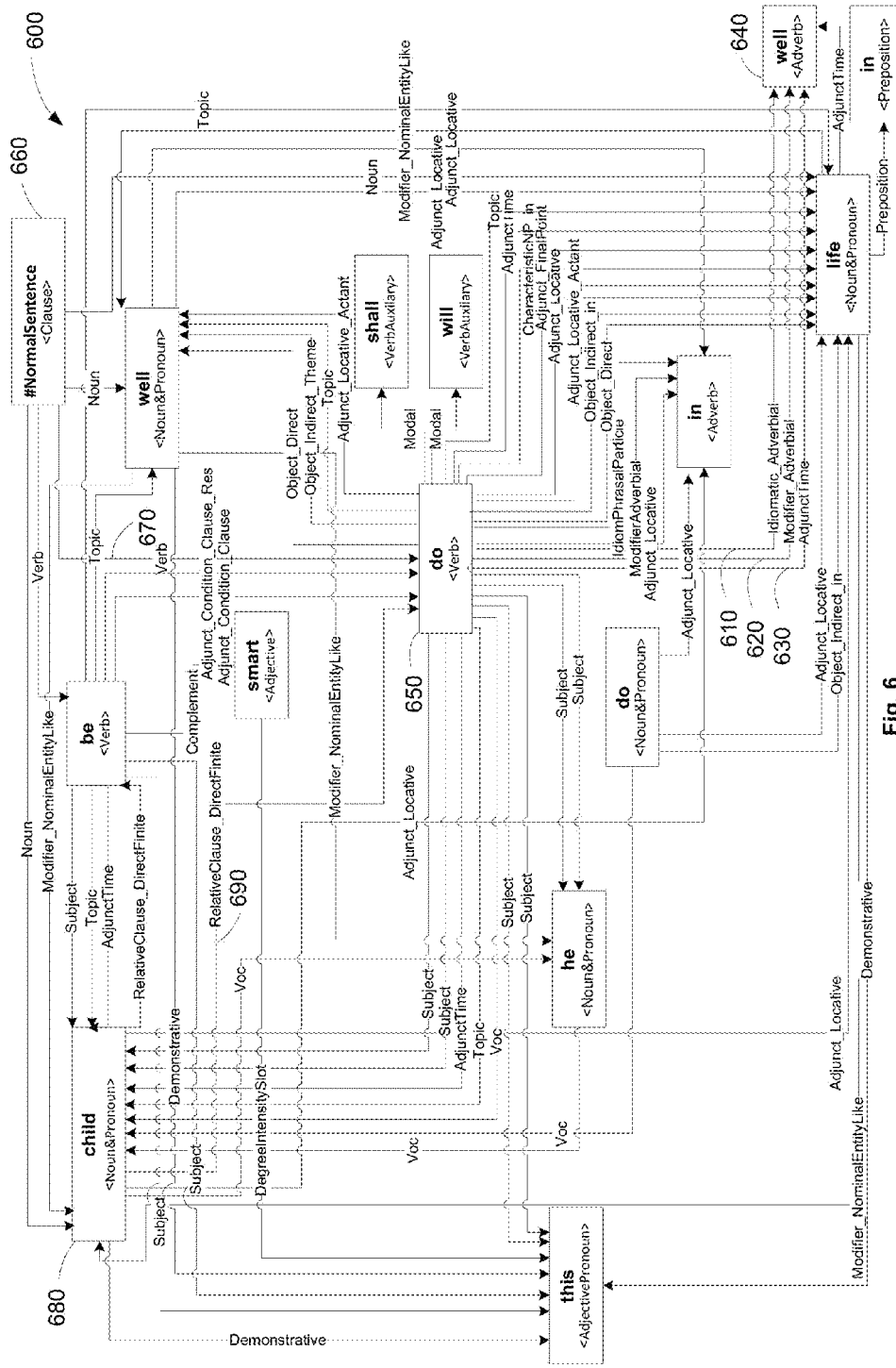
FIG. 6 shows a graph of generalized constituents for the sentence "This child is smart, he'll do well in life" in accordance with an illustrative embodiment of the disclosure.

FIG. 6 demonstrates an illustrative graph of generalized constituents (600) and illustrates constituents for the sentence: "This child is smart, he'll do well in life." The constituents are shown as rectangles with each constituent having a lexeme as its core. A morphological paradigm (usually a part of speech) of the core of a constituent is expressed by the grammemes for the parts of speech and shown in square brackets below the lexemes. The morphological paradigm (which is part of the description of the word) changes and a morphological description contains information related to word changes of one or more parts of speech. For example, because the word "do" can be one of two parts of speech: <Verb> or <Noun> (which is represented as a generalized morphological paradigm <Noun&Pronoun>), the graph (600) shows two constituents for "do." In addition, the graph shows two constituents for "well." Because the source sentence used the abbreviation "'he'll," the graph shows two possibilities for the abbreviation, "will" and "shall." The precise syntactic analysis task will consist of selecting only those constituents from all the possible ones that will depict the syntactic structure of the source sentence.

The links in the graph (600) are filled-in surface slots of the core of the constituent. The name of the slot is reflected on the arrow on the graph. The constituent has a core of a lexeme, which may have source named arrows designating surface slots (415) filled with child constituents, along with child constituents. The incoming arrow designates attaching a constituent to the surface slot of another constituent. Graph (600) has numerous arrows (edges) because it reflects all of the possible relationships that may be established between the constituents of the sentence. Of course, there are relationships between constituents that will be discarded. The significance of the prior rough rating methods mentioned earlier is retained in each arrow that designates a filled-in deep slot. In general, surface slots and links with high rated values will be selected for the next stage of syntactic analysis.

It is possible that a pair of constituents is attached by several branches. This means that there are several suitable surface models for the pair of constituents and that several surface slots for parent constituents may be independently filled by child constituents. For example, three surface slots Idiomatic_Adverbial (610), Modifier_Adverbial (620) and AdjunctTime (630) for the parent constituent "do<Verb>" (650) may be independently filled with a child constituent "well<Verb>" (640), depending on the surface model of the constituent "do<Verb>." Thus, "do<Verb>" (650)+ "well<Verb>" form a new constituent with a core of "do<Verb>" joined to another parent constituent, such as #NormalSentence<Clause> (660) in surface slot Verb (670) and to "child<Noun&Pronoun>" (680) in surface slot RelativClause_DirectFinite (690). The marked element #NormalSentence<Clause> (660), is the "root," and corresponds to the entire sentence.

Referring again to FIG. 5, coordination processing (550) is also involves graph of generalized constituents (360). Coordination is a language phenomenon that is represented in sentences with numbers and/or conjunctions, such as [and], [or], [but], and so forth. For example, a sentence that includes coordination is "John, Mary and Bill come home." In this case, only one of the child constituents is joined to the surface slot of the parent constituent at the stage when the graph of generalized constituents is constructed (540). If a constituent that may be a parent constituent has a surface slot that is filled in for a coordinated constituent, then all of the coordinated constituents are taken and an attempt is made to attach all of the child constituents to the parent constituent, even if there is no contact or attachment among the coordinated constituents. At the stage where the coordination is worked out (550), the linear order and the capacity to fill in the surface slots in multiple ways are determined. If attachment is possible, the preliminary form relating to the general child constituent is created and attached. As FIG. 5 shows, the coordination handler (582) or other algorithms may be adapted to handle the coordination (550) using the coordination descriptions (454) in constructing (540) the graph of generalized constituents. A dispatcher (590) algorithm may be adapted to handle construction of models for generalized constituents (540).

It may be impossible to construct (540) a graph of generalized constituents without restoring an ellipsis (560). An ellipsis is a phenomenon of a language represented by the absence of a core constituent. The process of restoring an ellipsis (560) is also needed to restore the omitted constituents. The following is an example of an elliptical sentence in English: "The President signed the agreement and the secretary [signed] the protocol." Coordination (550) and restoration of the ellipsis (560) are done at the stage in each program cycle of the dispatcher (590) after the graph of generalized constituents is constructed (540), and then the construction may be continued, as shown with arrow 542. If it is necessary to restore an ellipsis (560) and results obtained during the rough syntactic analysis stage (130), such as constituents remaining without any other constituent, only these constituents will be processed. An ellipsis handler (580) algorithm may be adapted to handle ellipsis restoration (560).

Precise Syntactic Analysis

Precise syntactic analysis (140) is performed to build the syntactic tree, which is the tree of the best syntactic structure, for the source sentence. Based on the totality of analysis, the tree represents a tree having a best-constructed syntactic structure (370) for the source sentence. Multiple syntactic trees may be constructed during analysis, and the most probable syntactic structure is taken to be the best syntactic structure (370). Semantic analysis (150) may be performed (by a semantic analyzer (342) on a best syntactic structure (370) to generate a corresponding semantic structure (380) for the source sentence. FIG. 3 shows that a precise syntactic analyzer (332) or its analogs perform a precise syntactic analysis (140) and create a best syntactic structure (370) based on assigning ratings using a priori ratings (336) from the graph of generalized constituents (360). A priori ratings (336) include ratings of lexical values such as frequency (or probability), rating of each syntactic construction (such as idioms, phrases, etc.) for each element in the sentence, and rating of the degree to which the selected syntactic construction and the deep slot descriptions (1220) agree. In addition to a priori ratings, statistical ratings obtained from studying the analyzer on large text corpora may also be used. Overall ratings may be computed and stored.

Then hypotheses are derived for the overall syntactic structure of the sentence. Each hypothesis may be represented as a tree, which in turn is a subgraph of the graph of generalized constituents (360) that covers the entire sentence. Then, the ratings as discussed above are made for each syntactic tree. During precise syntactic analysis (140), the hypotheses about syntactic structure of a sentence are verified by computing various types of ratings. These ratings may be computed as a degree of agreement between the constituents in deep slots and their grammatical and semantic descriptions, such as grammatical limitations (e.g., grammatical meaning (414)) in syntforms and semantic limitations for items filling (fillers of) deep slots (1214) in the deep model (1212). Other types of ratings might be the degrees of freedom of lexical values (1312) for pragmatic descriptions (344), which may be absolute and/or conditional probability evaluations of syntactic constructions that are designated as surface models (410), and the degree of coordination of their lexical values with those of the remaining constituents.

Ratings may be computed for each type of hypothesis based on a priori rough ratings produced from rough syntactic analysis (130). For example, a rough rating can be computed for each generalized constituent on the graph of generalized constituents (360), and the ratings may be computed as a result of the rough ratings. Different syntactic trees may be constructed with differing ratings. The ratings are computed and then these ratings are used to create hypotheses about the full syntactic structure of the sentence. In doing so, the hypothesis with the highest rating is chosen. A rating is computed during the precise syntactic analysis until a satisfactory result is obtained or a better syntactic tree with a higher rating is constructed.

The hypotheses that reflect the most probable syntactic structure of the entire sentence then can be generated and produced. From the syntactic structure (370), alternatives with higher ratings, and alternatives of the syntactic structure with lower ratings, hypotheses of syntactic structures are created during the precise syntactic analysis until a satisfactory result is obtained or a better syntactic tree with the highest rating is obtained.

The syntactic tree with the best rating is selected as a hypothesis about the syntactic structure with the best rating, which is reflected in the graph of generalized constituents (360). This syntactic tree may be considered the best (most probable) hypothesis about the syntactic structure of the source sentence (302). Then, non-tree links in the sentence are constructed and consequently the syntactic tree is transformed into a graph as the best syntactic structure (370), as it is the best hypothesis about the syntactic structure of the source sentence. If the non-tree relationships cannot be restored in the best syntactic structure, the next highest rated structure is selected for subsequent analysis.

If precise syntactic analysis was unsuccessful or the most probable hypothesis cannot be found after precise syntactic analysis, there is a return (334), from construction of the unsuccessful syntactic structure at the precise syntactic analysis stage (140), to the rough syntactic analysis stage (130) wherein all syntforms (not just the best ones) are examined during the syntactic analysis. If no better syntactic tree is found or the system was unable to restore the non-tree relationships in any of the selected "best structures," an additional rough syntactic analysis (130) is conducted that considers the non "best" syntforms that were not previously analyzed as described.

Figure 7:
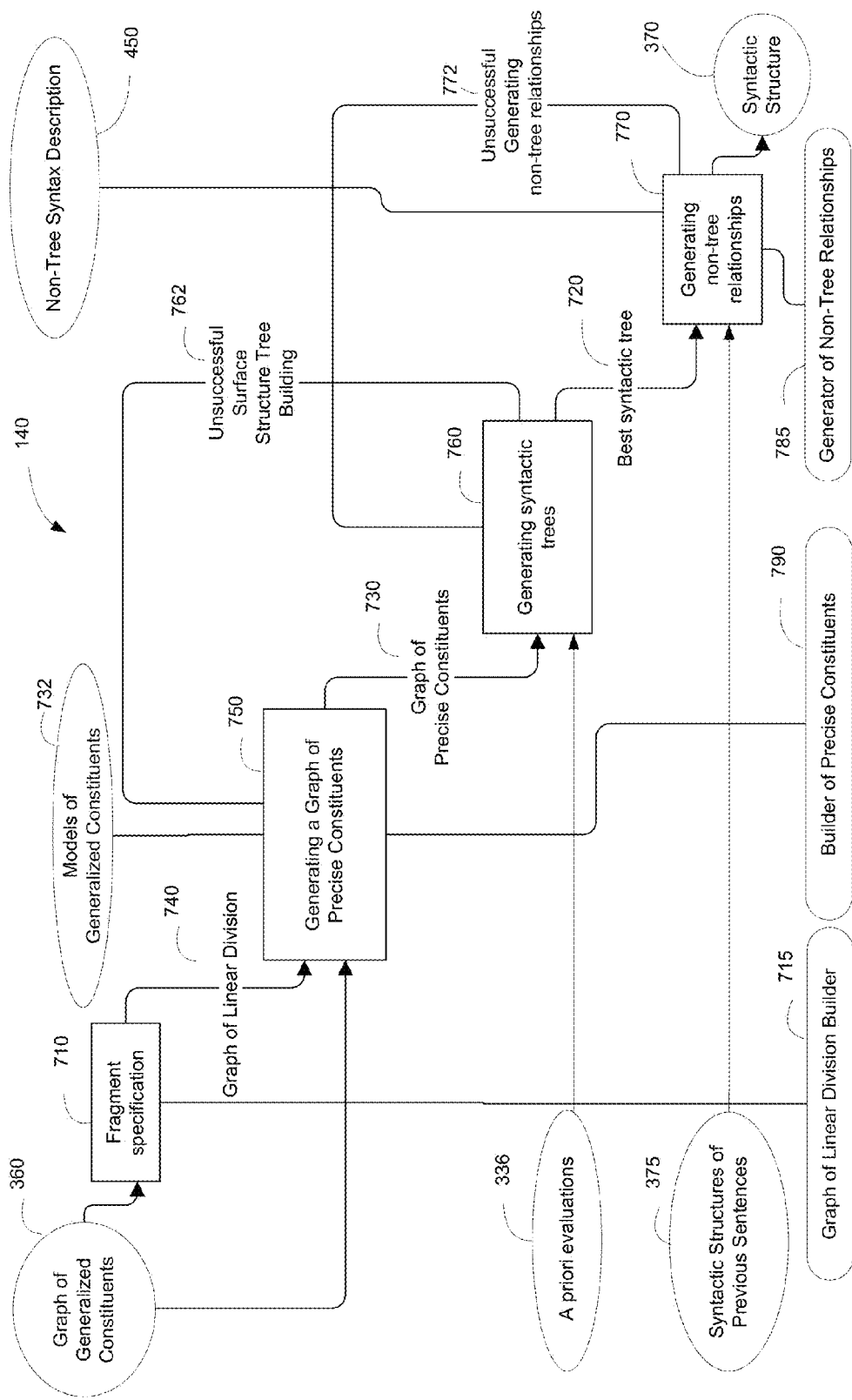
FIG. 7 shows a diagram of precise syntactic analysis in accordance with an illustrative embodiment of the disclosure.

FIG. 7 shows in detail a precise syntactic analysis (140) that is done to select a set of the best syntactic structures (370) in accordance with an illustrative embodiment of the invention. The precise syntactic analysis (140) is done from top to bottom, from the higher levels to the lower ones. For example, the precise syntactic analysis is conducted from the node at the potential vertex of the graph of generalized constituents (360) down to its lower level of child constituents.

The precise syntactic analysis (140) may contain various stages that include an initial stage, stage (750) for creating a graph of precise constituents, stage (760) for creating syntactic trees and a differential selection of the best syntactic structure, and stage (770) for restoring non-tree relationships and obtaining the best syntactic structure from among the remaining ones. The graph of generalized constituents (360) is analyzed at the preliminary analysis stage, which prepares the data for precise syntactic analysis (140).

During precise syntactic analysis (140), detailed constituents are created. The generalized constituents (522) are used to build a graph of precise constituents (730) to create one or more trees of precise constituents. For each generalized constituent, all of the possible relationships and their child constituents are indexed and marked.

Stage 760 for generation of syntactic trees is done to produce the best syntactic tree (720). Stage 770 for restoration of non-tree relationships may use rules for establishing non-tree links and information about the syntactic structure (375) of the previous sentences to analyze one or more syntactic trees (720) and select the best syntactic structure (370) from among various syntactic structures. Each generalized child constituent may be included in one or more parent constituents in one or more fragments. The precise constituents are nodes on the graph (730) and one or more trees of precise constituents are created based on the graph of precise constituents (730). If the non-tree relationships cannot be restored (772) to obtain the best syntactic structure, the next highest rated structure is selected for subsequent analysis by stage 706.

The graph of precise constituents (730) is an intermediate representation between the graph of generalized constituents (360) and the syntactic trees. Unlike the syntactic tree, the graph of precise constituents (730) may have several alternative items to fill a single surface slot. The precise constituents are set up as a graph such that a specific constituent may be included in several alternative parent constituents so as to optimize further analysis to select a syntactic tree. Thus the structure of an intermediate graph is sufficiently compact to compute a structural rating.

During a recursive stage (750) in creating a graph of precise constituents, the precise constituents are arranged on a graph (740) of linear division using the left and right boundaries of the core constituent. During stage (750) various models of generalized constituents (732) may be analyzed. The builder of precise constituents (790) or other algorithms may be adapted to handle the generation of the graph of precise constituents (750). For each constituent, a path is constructed on the graph of linear division (740), a set of syntforms is determined, and for each syntform, the linear order is checked and evaluated. As a result, a precise constituent is created for each syntform and the construction of precise child constituents is initiated during the recursive process.

A graph of precise constituents that covers the entire sentence is also attempted to be constructed by stage 750. If stage 750 is unsuccessful in creating the graph of precise constituents (730) to cover the entire sentence, a procedure is initiated to attempt to cover the sentence with syntactically separate fragments (e.g., as specified by fragment specification stage 710). The graph of linear division builder (715) or other algorithms may handle the specification of fragments.

As FIG. 7 shows, if the graph of precise constituents (730) covering the entire sentence is successfully constructed, one or more syntactic trees may then be constructed at the creation stage (760). The syntactic tree generation stage (760) allows creation of one or more trees with a specific syntactic structure. Because the surface structure is fixed in a specific constituent, corrections may be made in assessing the structural rating, including imposing penalty syntforms that may be complex or may not comply with the style or the rating for the linear order.

The graph of precise constituents (730) represents several alternatives that correspond to various breakdowns of the sentence and/or various sets of surface slots. Accordingly, the graph of precise constituents includes a set of possible trees (i.e., syntactic trees) because each slot may have several alternative items that may fill it. The fillers with the best rating correspond to precise constituents (a tree) with the best rating. Therefore the precise constituents are a unique syntactic tree with the best rating for a slot. At stage 760, alternatives are sought and one or more trees are constructed with a fixed syntactic structure. Non-tree relationships have not yet been set up in the tree constructed at this stage and will be generated in stage 770 by a generator of non-tree relationships (785). The result of this step is production of a set of the best syntactic trees (720) with the best ratings.

The syntactic trees are constructed based on the graph of precise constituents. Varying syntactic trees are constructed in decreasing order of the structural ratings they are awarded. Lexical ratings cannot be used to their full extent because their deep semantic structure has not been established at this time. Unlike the initial precise constituents, each resulting syntactic tree has a fixed syntactic structure and each precise constituent in it has its own filler for each surface slot.

During stage 760, the best syntactic tree (720) may be generated recursively and transversally based on the graph of precise constituents (730). The best syntactic subtrees are created for the best child precise constituents, a syntactic structure is the created based on a precise constituent, and the child subtrees are attached to the syntactic structure formed. The best syntactic tree (720) may be constructed, for example, by selecting the surface slot with the best rating from among the remaining surface slots of this constituent, and by creating a copy of the child constituent whose subtree is of the best rating. This procedure is then applied recursively to the child precise constituent.

A set of the best syntactic trees having specific rating can be generated based on each precise constituent. This rating may be computed in advance and specified in the precise constituents. After the best trees have been generated, the new constituent is created based on the preceding precise constituent. This new constituent in turn generates syntactic trees with the second-highest rating. Consequently the best syntactic tree may be generated based on a precise constituent and may be constructed based on this precise constituent. For example, two types of ratings may be constructed for each precise constituent during stage 760, one of them being a quality rating of the best syntactic tree that can be constructed based on the current precise constituent and the other being a quality rating of the second-best tree. The rating for the syntactic tree may then be computed based on the current precise constituent.

The rating for the syntactic tree is computed based one or more values, including the structural rating for the constituent, the top rating for the set of lexical values, the top deep statistic for the child slots, and the rating for the child constituents. When the precise constituent is analyzed in order to compute the rating for the syntactic tree that might be constructed based on the precise constituent, the child constituents with the best ratings are analyzed in the surface slot. During stage 760, computation of the rating for a second-best syntactic tree differs only in that the second-best constituent is chosen for one of the child slots. Any syntactic tree with minimum loss in the rating when compared to the best syntactic tree should be selected during stage 760.

At stage 760, a syntactic tree may also be constructed with a fully determined syntactic structure (e.g., a tree). Such a fully determined syntactic structure includes the syntactic form, the child constituents, and the surface slots they fill are determined. After a tree has been created based on the best hypothesis about the syntactic structure of the source sentence, this tree is considered the best syntactic tree (720). When there are no syntactic trees with a satisfactory rating, or precise syntactic analysis is unsuccessful, there may be a return (762) from creating syntactic trees (760) back to creating a graph of generalized constituents (750).

Figure 8:
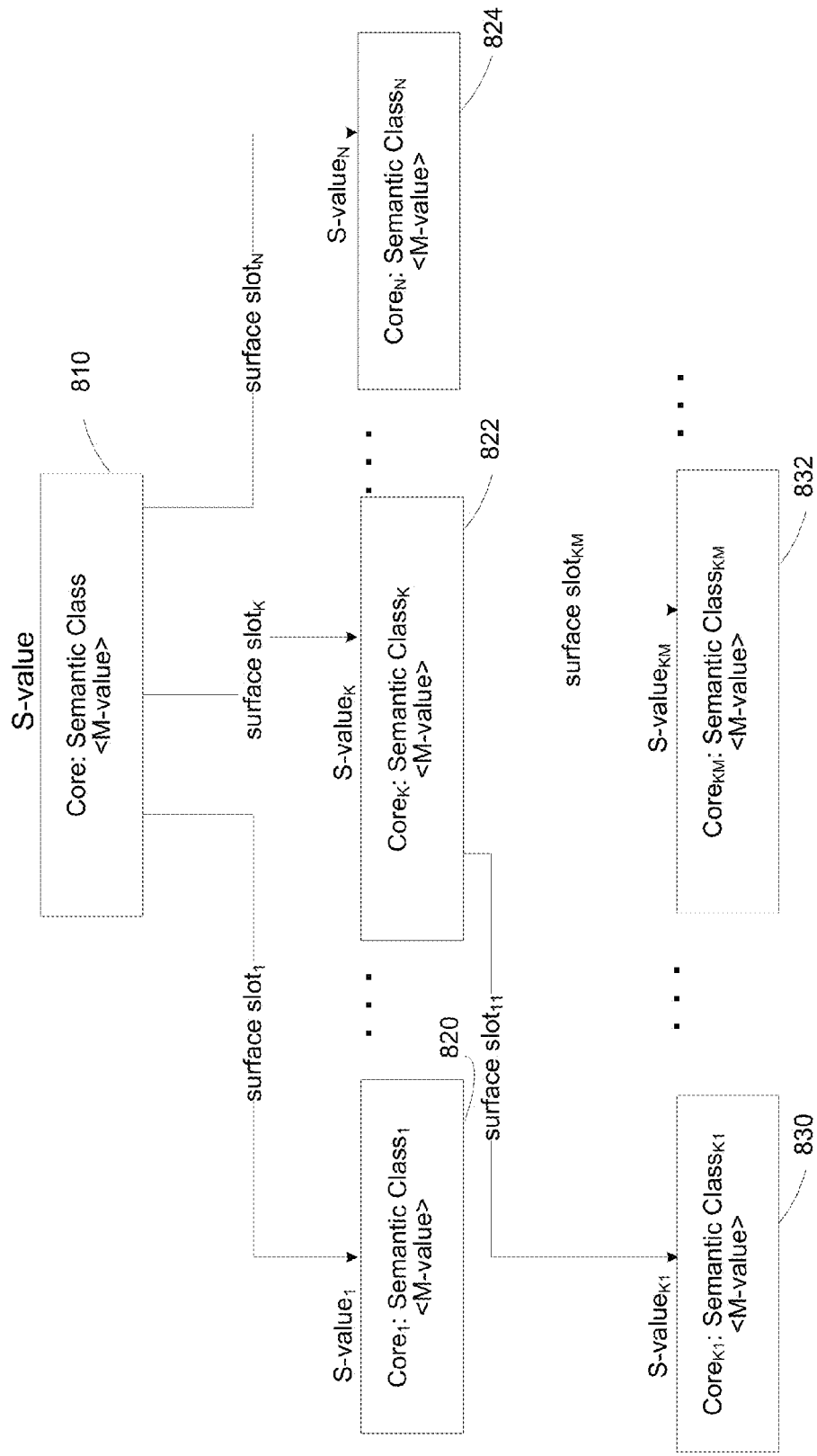
FIG. 8 shows a diagram of a syntactic tree in accordance with an illustrative embodiment of the disclosure.

FIG. 8 shows an example of a syntactic tree in accordance with an illustrative embodiment. In FIG. 8, the constituents are shown as rectangles (e.g., 810, 820, 822, 824, 830, and 832) and the arrows indicate the filled surface slots. A constituent has a word with a morphological value (M-value) as its core and a SemanticClass. A constituent may also have lower-level child constituents attached to it, depicted arrows that indicate the filled surface slots. Each constituent also has a syntactic value (S-value) expressed as grammemes of syntactic categories. These grammemes are a characteristic of the syntactic forms chosen for a constituent during precise syntactic analysis (140).

Returning to FIG. 1, at stage 107, a language-independent semantic structure, which represents the idea of the source sentence, is constructed. This stage may also include restoration of referential relationships between sentences. For example, a referential relationship may be an anaphora, where the use of linguistic constructions that can be interpreted only if another text fragment (usually the previous one) is taken into account.

FIG. 2 shows a flowchart of a method of analyzing a sentence in accordance with an illustrative embodiment. Referring to FIGS. 1 and 2, the lexical-morphological structure (222) is determined at the stage of analysis (106) of the source sentence (105). FIG. 2A depicts an example of the lexical-morphological structure for the English sentence, "The child is smart, he'll do well in life." The lexical-morphological structure of FIG. 2A is a data structure for storing a set of possible alternatives of "lexical value—grammatical value" pairs for each lexical unit (i.e. word) in a sentence. Each word may also have multiple means, and thus have variants of "lexical value—grammatical value" pairs for the various meanings. For example, "ll" (2207) of the contraction "he'll" may mean "shall" (2112) or "will" (2114), and is thus depicted as having variants for both "shall" and "will." The "lexical value—grammatical value" pair for "shall," may include: <Verb, GTVerbModel, Zero-Type, Present, Nonnegative, Composite_||>. The "lexical value—grammatical value" pair for "will," may include: <Verb, GTVerbModel, ZeroType, Present, Nonnegative, Irregular, Composite_||>. As another example, FIG. 2A depicts six "lexical value—grammatical value" pairs corresponding to six the variants of "smart" (2204). Similarly, FIG. 2A depicts alternatives for the other lexical units of the sentence (2201, 2202, 2203, 2206, 2208, 2209, 2210, and 2211). The punctuation (e.g., comma, period, etc.) of the sentence (2205 and 2212) are shown as not having "lexical value—grammatical value" pairs. A syntactic analysis may be performed on the sentence as a two-stage algorithm (rough syntactic analysis and precise syntactic analysis as discussed above) using linguistic models and information at various levels to compute probabilities and create a set of syntactic structures.

Thus, as previously noted, rough syntactic analysis is applied to a source sentence and includes in particular the generation of all potential lexical values for words that make up the sentence or phrase, of all the potential relationships among them, and of all potential constituents. All probable surface syntactic models are applied for each element of the lexical-morphological structure. Then all possible constituents are created and generalized so as to represent all possible variations of the syntactic breakdown of the sentence. The result is the formation of a graph of generalized constituents (232) for subsequent precise syntactic analysis.

The graph of generalized constituents (232) includes all the potentially possible relationships within the sentence. The rough syntactic analysis is followed by precise syntactic analysis on the graph of generalized constituents, resulting in the "derivation" of a certain number of syntactic trees (242) that represent the structure of the source sentence. Construction of a syntactic tree (242) includes a lexical selection for the vertices in the graph and a selection of the relationships between the vertices of the graph. A set of a priori and statistical ratings may be used when selecting lexical variations or when selecting relationships from the graph. A priori and statistical ratings may also be used, both to evaluate the parts of the graph and to evaluate the entire tree. Non-tree relationships are also checked and constructed. Then, after a set of syntactic (or semantic) trees is produced, only those that have a different syntactic (or semantic) structure and high overall rating are chosen (e.g., the best/most probable syntactic structures (246)), and a universal (language-independent) semantic structure (252) may be generated from the best syntactic structures. One possible way of computing values for difference (or similarity) between structures is detailed below.

In an illustrative embodiment, the similarity between an i-th and a j-th semantic structures may be measured as:

$$\text{sim}(\text{structure}_i, \text{structure}_j) = f(x_{1_i}, x_{1_j}, x_{2_i}, x_{2_j}, \ldots, x_{n_i}, x_{n_j}, \alpha, \beta)$$

In an illustrative embodiment, the difference between the i-th and the j-th semantic structures may be measured as:

$$\text{diff}(\text{structure}_i, \text{structure}_j) = h(x_{1_i}, x_{1_j}, x_{2_i}, x_{2_j}, \ldots, x_{n_i}, x_{n_j}, \alpha, \beta)$$

The vector of variables $(x_{1_i}, \ldots, x_{n_i})$ is used for the i-th semantic structure and the vector of variables $(x_{1_j}, \ldots, x_{n_j})$ is used for the j-th semantic structure. The coordinates for vectors are values of parameters used to describe a given semantic structure. For example, such variables as SemClass$_i$, deepSlots$_i$, non-treeLinks, $\alpha$, $\beta$, $\gamma$ etc. may each be used. SemClass are the semantic classes in the semantic structure; deepSlots are the deep slots assumed by the constituents in the semantic structure; non-treeLinks are the non-tree relationships restored in the semantic structure; and $\alpha$, $\beta$, $\gamma$ are weighting values that may be selected to correspond to the variables in this equation. In an illustrative embodiment, a function may be computed for a sentence that determines the measure of closeness (or distance), $\rho(C_{k_i}, C_{l_j})$, between the semantic classes $C_k$ in the i-th semantic structure and $C_l$ the j-th semantic structure, where $C(\text{Structure}_i) = (C_{1_i}, \ldots, C_{k_i}, \ldots, C_{n_i})$ is the set of semantic classes for the i-th semantic structure, and $C(\text{Structure}_j) = (C_{1_j}, \ldots, C_{l_j}, \ldots, C_{m_j})$ is the set of semantic classes for the j-th semantic structure. The number of semantic classes n in the i-th semantic structure may not be equal to the number of semantic classes m in the j-th semantic structure.

As an example, the similarity between structures Structure$_i$ and Structure$_j$ may be computed using the following formula:

$$\text{sim}(\text{Structure}_i, \text{Structure}_j) = g\left(\frac{\sum_{C_k \in C(\text{Structure}_i), C_l \in C(\text{Structure}_j)} \text{sim}(C_k, C_l)}{|C(\text{Structure}_i)| \cdot |C(\text{Structure}_j)|}\right)$$

where $|C(\text{Structure}_i)|$ is the cardinality of a set Structure$_i$, (i.e., the number of classes in the i-th structure), $|C(\text{Structure}_j)|$ is the cardinality of a set Structure$_j$, (i.e., the number of classes in the j-th structure), and a mathematical function may be denoted as g. The formula described above may be used both to measure the similarity between semantic structures and to measure the similarity between syntactic structures.

Additionally, the difference between structures may be computed using a formula such as:

$$\textit{diff}(Structure_i, Structure_j) = g\left(\frac{\sum_{Ck \in C(Structure_i), Cl \in C(Structure_j)} \textit{diff}(Ck, Cl)}{|C(Structure_i)| \cdot |C(Structure_j)|}\right)$$

FIGS. 9A and 9B show examples of syntactic structures 900a and 900b (i.e. trees) produced from precise syntactic analysis as described herein. In these examples, syntactic analysis was performed on the English sentence "THE POLICE SHOT THE RIOTERS WITH GUNS." The analysis resulted in the construction of syntactic structures considered to be the most probable structures. The syntactic structures 900a and 900b include data related to determined syntactic information, such as lexical values, parts of speech, syntactic roles, grammatical values, syntactic relationships (slots), syntactic models, types of non-tree links, etc. Because the source sentence contains ambiguity (e.g., the noun "gun" may be dependent on the noun "rioters" or the verb "shot"), syntactic structures 900a and 900b differ both structurally and in their surface or deep slots. For example, there is a difference in the dependence of the word "gun." The dependencies of the word "gun" are reflected in the structures as arrows 901 and 903. Similarly, the deep slots 902 and 904 differ for the corresponding lexical value «gun: ARTILLERY_AS_WEAPON». This can be seen with reference to the deep slot 903, which is "PartComplement_EntityLike," and the deep slot 904, which is "Instrument". In other examples, there may be differences caused by the selection of lexical values or semantic classes. Differences of this nature are particularly present for homonyms or homographs.

The two-stage analysis approach discussed above follows the principle of cohesive goal-oriented recognition. In other words, hypotheses about the structure of a portion of the sentence are verified using the existing linguistic models within the framework of the entire sentence. With this approach, analysis of a large number of dead-end versions of a parsing may be avoided. In the majority of cases, this type of approach allows for a substantial reduction of the computer resources needed to analyze a sentence.

FIGS. 9C and 9D show a chart of the semantic structures 900c and 900d produced from the analysis of the sentence "THE POLICE SHOT THE RIOTERS WITH GUNS." These structures are independent of the language of the source sentence and contain the information required to determine the meaning of the sentence. For example, data structures 900c and 900d contain syntactic and semantic information, such as semantic classes, semantemes (not shown in the figure), semantic relationships (deep slots), and non-tree links (relationships), etc. This syntactic and semantic information is sufficient to establish the meaning of the source sentence in same language or in a different language.

A language-independent semantic structure of a sentence may be represented as an acyclic graph (a tree, supplemented by non-tree links) where each word of a specific language is replaced with universal (language-independent) semantic entities. These semantic entities are also referred to as semantic classes herein. Arranging these semantic classes in a Semantic Hierarchy is useful in the embodiment of this invention. The Semantic Hierarchy is constructed such that a "child" semantic class and its "descendants" inherit a significant portion of the properties of the "parent" and all previous semantic classes ("ancestors"). For example, the semantic class SUBSTANCE is a child class of the broad class ENTITY, and at the same time SUBSTANCE is a "parent" class of semantic classes GAS, LIQUID, METAL, WOOD_MATERIAL, etc. Each semantic class in a Semantic Hierarchy is covered by a deep semantic model. The deep model is a set of deep slots (i.e. types of semantic relationships in sentences). Deep slots reflect the semantic roles of child constituents (structural units of a sentence) in various sentences with items from the semantic class as the core of a parent constituent and possible semantic classes as items filling (fillers) the slot. The deep slots also reflect the semantic relationships between constituents, such as "agent," "addressee," "instrument", "quantity," and so forth. The child class inherits the deep model of the parent class, which may be adjusted for the child class.

The Semantic Hierarchy is formed such that broader concepts are generally at the upper levels of the hierarchy. For example, in the case of documents, the semantic classes may be: PRINTED_MATTER, SCIENTIFIC_AND_LITERARY_WORK, TEXT_AS_PART_OF_CREATIVE_WORK. These classes may be descendants of the class TEXT_OBJECTS_AND_DOCUMENTS. Further, the class PRINTED_MATTER may be a parent for the semantic class EDITION_AS_TEXT, which contains the classes PERIODICAL and NONPERIODICAL, where PERIODICAL is the parent class for the classes ISSUE, MAGAZINE, NEWSPAPER, etc. The approach to the arrangement of classes may vary. It should be noted that the concepts disclosed by the present invention are independent of any particular language.

Figure 10:
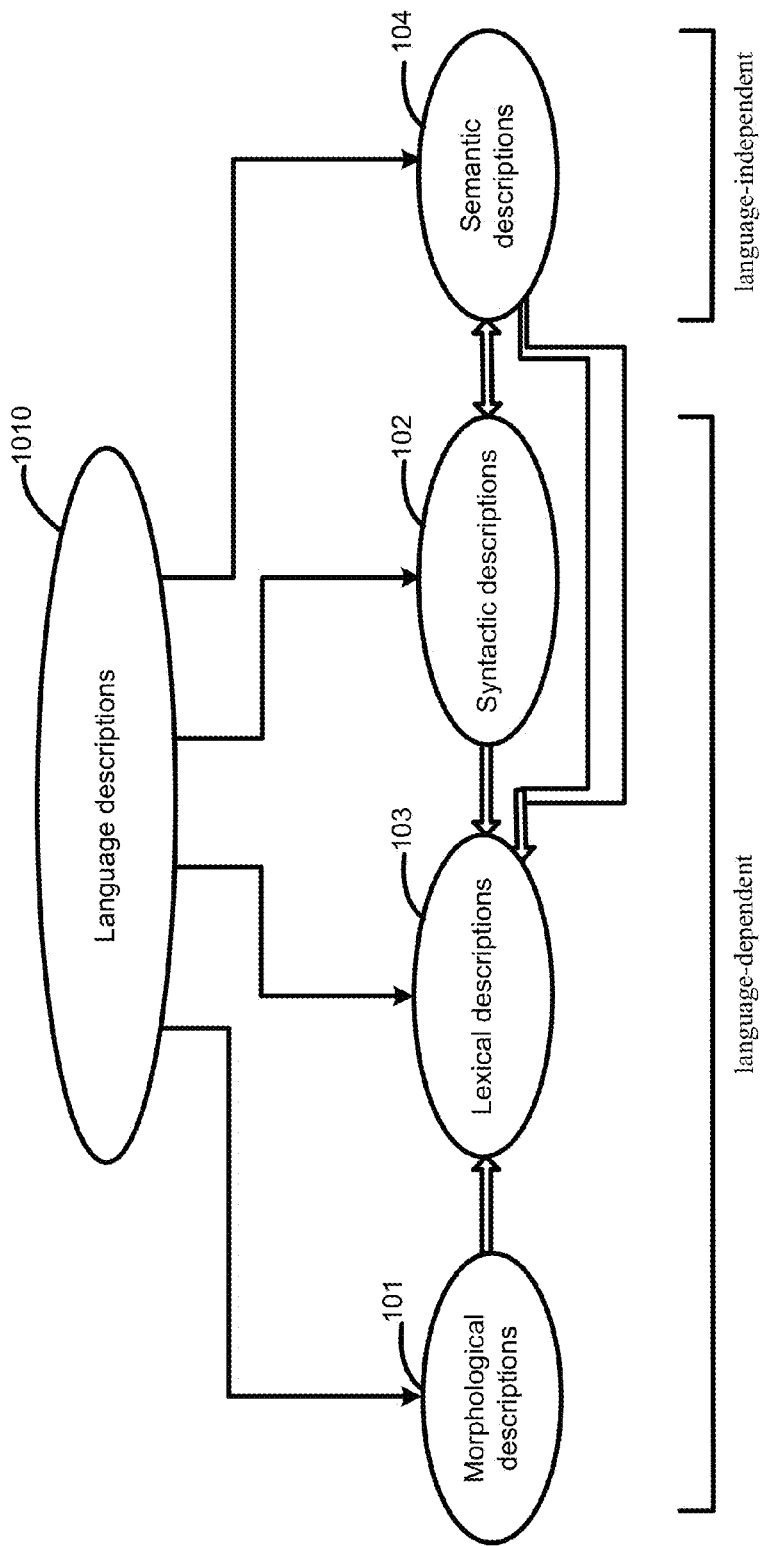
FIG. 10 shows a diagram of language descriptions in accordance with an illustrative embodiment of the disclosure.
Figure 11:
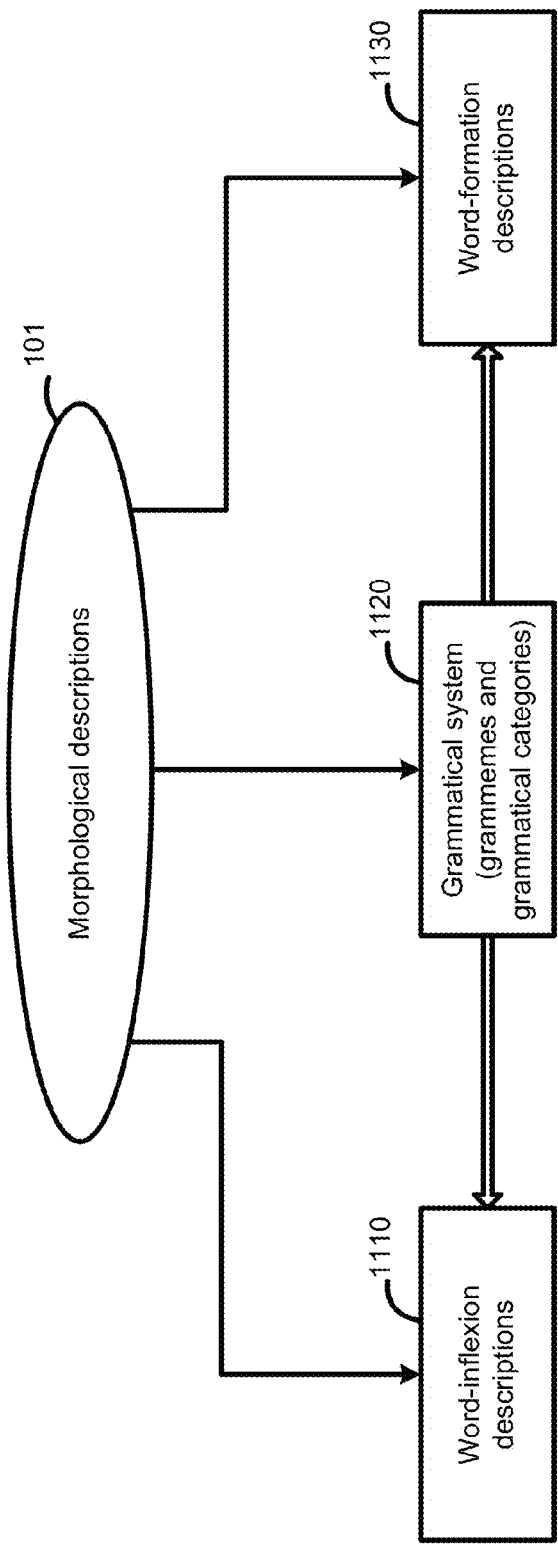
FIG. 11 shows a diagram of morphological descriptions in accordance with an illustrative embodiment of the disclosure.
Figure 12:
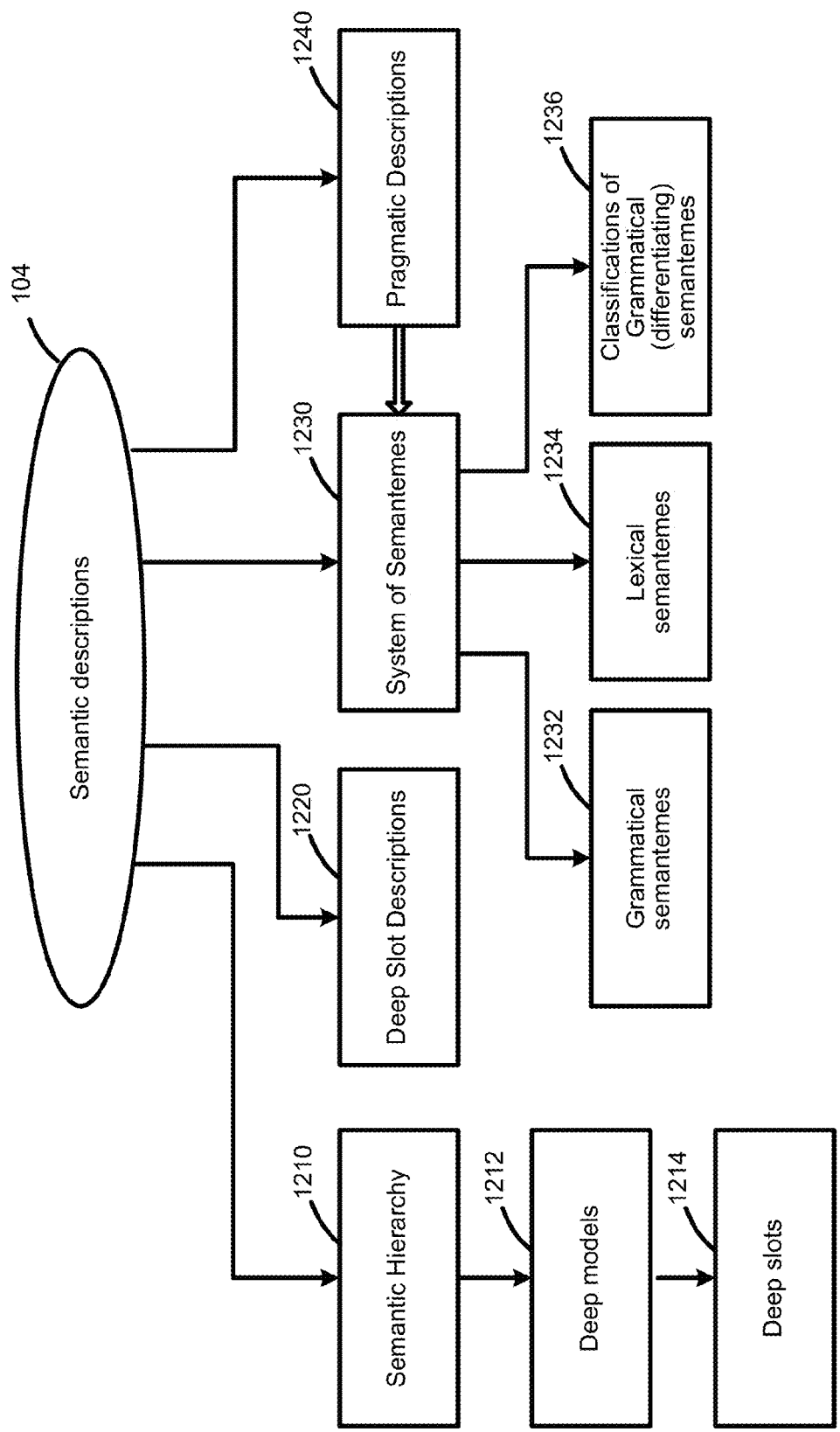
FIG. 12 shows a diagram of semantic descriptions in accordance with an illustrative embodiment of the disclosure.
Figure 13:
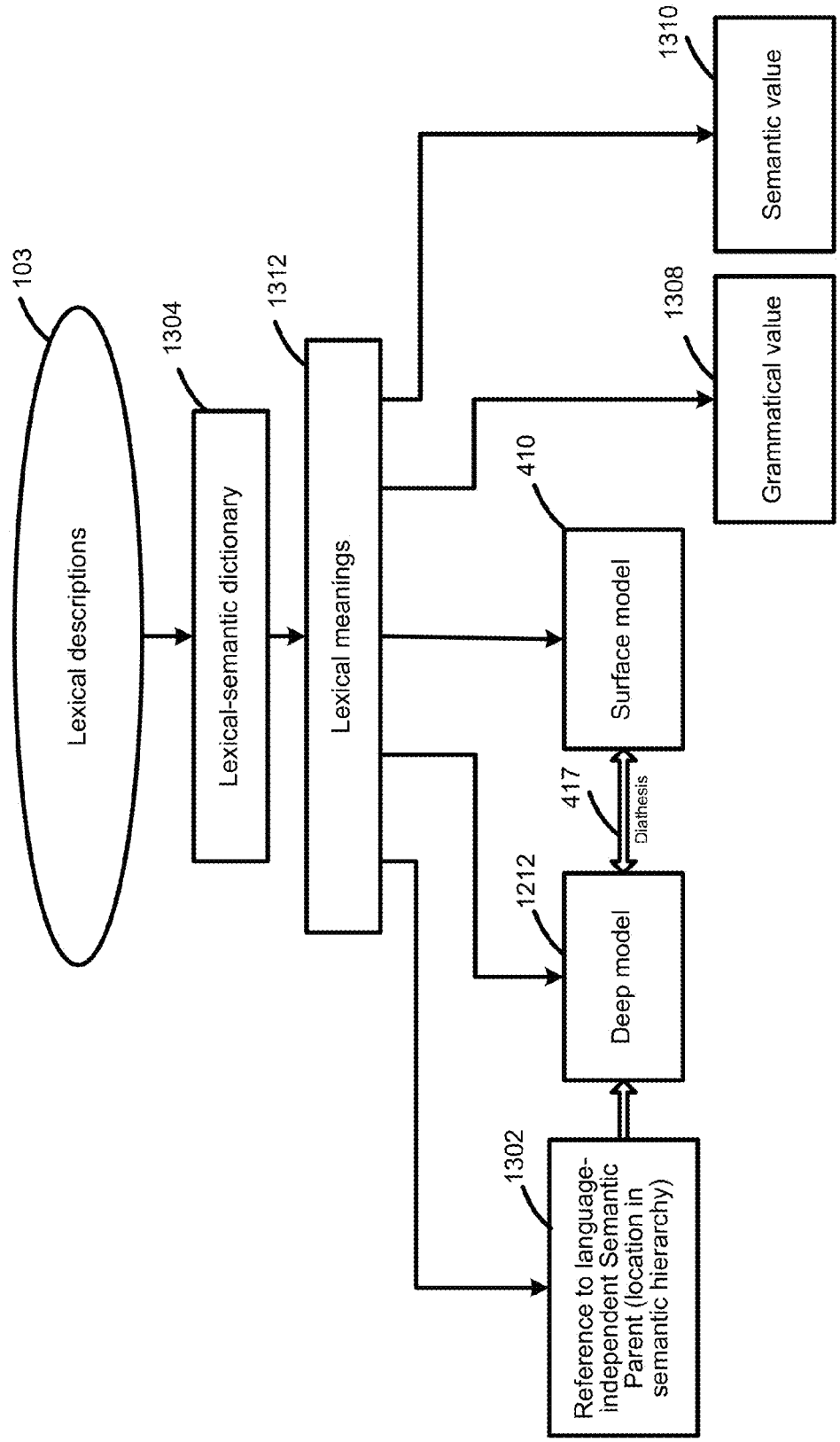
FIG. 13 shows a diagram of lexical descriptions in accordance with an illustrative embodiment of the disclosure.

FIG. 10 is a chart illustrating relationships of language descriptions (1010) according to an illustrative embodiment of the invention. Language descriptions (1010) include morphological descriptions (101), syntactic descriptions (102), lexical descriptions (103), and semantic descriptions (104). Language descriptions (1010) are depicted as a general concept. With reference to FIG. 11, morphological descriptions (101) are shown in more detail. With reference to FIG. 4, syntactic descriptions (102) are shown in more detail. With reference to FIG. 13, lexical descriptions (104) are shown in more detail. With reference to FIG. 12, semantic descriptions (104) are shown in more detail.

A Semantic Hierarchy may be created and then later be populated according to various languages. A semantic class of a specific language includes lexical values with the corresponding models. Semantic descriptions (104), however, do not depend on the language. Semantic descriptions (104) may contain a description of deep constituents and may contain a Semantic Hierarchy, descriptions of deep slots and a system of sememtemes and pragmatic descriptions.

In an illustrative embodiment, the morphological descriptions (101), lexical descriptions (103), syntactic descriptions (102), and semantic descriptions (104) are connected as depicted in FIG. 10. A lexical value may have several surface (syntactic) models depending on the semantemes and pragmatic characteristics. The syntactic descriptions (102) and semantic descriptions (104) are also connected. For example, a diathesis of syntactic descriptions (102) may be viewed as an "interface" between the language-dependent surface models and the language-independent deep models of the semantic description (104).

FIG. 4 shows an example of syntactic descriptions (102). The components of the syntactic descriptions (102) may contain surface models (410), syntactic forms (412), surface slots (415), linear order descriptions (416), diatheses (417), grammatical values (414), government and agreement descriptions (440), communicative descriptions (480), analysis rules (460), semantemes calculating rules (462), normalization rules (464), surface slot descriptions (420), non-tree syntax descriptions (450) ellipsis descriptions (452), coordination descriptions (454), and referential and structural control descriptions (456). The syntactic descriptions (102) are used to construct possible syntactic structures for the sentence for a given source language, taking into account word order, non-tree syntactic phenomena (such as agreement or ellipsis), referential control (management) and other phenomena.

FIG. 11 shows an example of morphological descriptions (101) according to an illustrative embodiment. The constituents of morphological descriptions (101) may include word-inflexion descriptions (1110), a grammatical system (1120), and word-formation descriptions (1130). In an illustrative embodiment, the grammatical system (1120) includes a set of grammatical categories such as "Part of speech," "Case," "Gender," "Number," "Person," "Reflexive," "Tense," "Aspect," and their values, which are referred to herein as grammemes.

FIG. 12 shows an example of semantic descriptions (104) according to an illustrative embodiment. While the surface slots descriptions (420) reflect the syntactic relationships and means to implement them in a specific language, deep slots (1214) reflect the semantic role of child (dependent) constituents in deep models (1212) of a semantic hierarchy (1210). Therefore, descriptions of surface slots, and more broadly surface models, can be specific for each actual language. The deep slot descriptions (1220) contain grammatical and semantic limitations on items that can fill these slots. The properties and limitations for deep slots (1214) and the items that fill them in deep models (1212) are often similar or identical for different languages.

The system of semantemes (1230) represents a set of semantic categories. Semantemes may reflect lexical (1234) and grammatical (1232) categories and attributes as well as differential properties and stylistic, pragmatic and communication characteristics. For example, the semantic category "DegreeOfComparison" may be used to describe degrees of comparison expressed in different forms of adjectives, such as "easy," "easier", and "easiest." Accordingly, the semantic category "DegreeOfComparison" may include semantemes such as "Positive," "ComparativeHigherDegree," and "SuperlativeHighestDegree." Lexical semantemes (1234) may describe specific properties of objects such as "being flat" or "being liquid", and may be used in limitations on items for filling deep slots. Classifications of grammatical (differentiating) semantemes (1236) are used to express differential properties within a single semantic class. Pragmatic descriptions (1240) serve to establish an appropriate theme, style or genre for the text during the analysis process, and it is also possible to ascribe the corresponding characteristics to objects in a Semantic Hierarchy. For example, pragmatic descriptions (1240) may be used to describe themes such as "Economic Policy", "Foreign Policy", "Justice", "Legislation", "Trade", "Finance", etc.

FIG. 13 shows an example of lexical descriptions (103) according to an illustrative embodiment. Lexical descriptions (103) include a lexical-semantic dictionary (1304), which includes a set of lexical meanings (1312). The lexical meanings (1312), along with their semantic classes, form a semantic hierarchy where each lexical value may include its reference to a language-independent semantic parent (i.e. the location in the semantic hierarchy) (1302), its deep model (1212), its surface model (410), its grammatical value (1308), and its semantic value (1310). Each lexical value may also attach various derivatives (such as words, expressions and phrases) that express meaning using various parts of speech, various forms of a word, words with the same root, etc. Thus, a semantic class maps the lexical values of words and expressions close in meaning in different languages.

In the process of analyzing the text, the system has to solve the problem of finding ambiguity in the text.

Ambiguity is generally understood to mean that several different highly-probable structures arise during one of the stages of deep analysis of the text. A highly-probable structure is a structure with a high overall rating. In addition to this one, any other criteria may be used to determine that a structure is highly-probable.

A step-by-step implementation of a deep analysis algorithm based on the use of a Semantic Hierarchy (SI) is described herein. The type of ambiguity is determined at the same stage of analysis during which the ambiguity was detected. For example, a syntactic ambiguity means that there are several probable syntactic structures at the syntactic analysis stage. Likewise, a semantic ambiguity means that there are several probable semantic structures at the semantic analysis stage.

A structure may be considered probable if it has a high overall rating. The rating is formed by a set of a priori and statistical evaluations. A priori and statistical ratings may also be used, both to evaluate the parts of the graph at one of the stages and to evaluate the entire tree. In an illustrative embodiment, a set of structures, such as syntactic trees, are constructed at the syntactic analysis stage. The best syntactic structures are selected from this set.

It may occur that a tree with a smaller overall rating also correctly reflects the structure of the sentence being analyzed. However, for several reasons, such as differing ways of computing the statistical ratings, the tree may have a lower overall rating and, as a result, the tree may be excluded from the next stage of the analysis as being less probable. Therefore, based on the method presented for finding ambiguity in natural language texts, this situation may be considered, and at different stages of deep analysis of the text unusual structures with high overall ratings can be extracted.

For example, at the stage where syntactic and semantic structures are constructed, overall ratings are computed for each corresponding structure in the text. If it is found that there are several different syntactic (semantic) structures with high overall ratings, it may be assumed that there is a syntactical (semantic) ambiguity in the text. A value Δ may be set in advance to reflect the permitted difference in value in overall ratings, and various structures can be distinguished on this basis. For example, this rule may be written formally as an inequality:

$$|S_i - S_j| \le \Delta$$

$S_i$ is the overall syntactic rating of the i-th semantic structure, $S_j$ is the overall syntactic rating of the j-th semantic structure, and Δ is the previously established (or selected) value by which ratings for structures (e.g. most probable/highest rated structures) may differ such the semantic structures may be extracted from the initial set of structures.

In addition to a numerical value that reflects a rating for the structure (syntactic or semantic), other rules may also be added. In accordance with such rules, it is established that when semantic structures differ enough that they may be considered different. A sentence in which there is an ambiguity may also be visualized apart in the text.

According to an illustrative embodiment, an ambiguity may be found based on to the content of the document. For example, a document may be a court or other legal document written in natural language. However, the text in the document may not be limited to a single natural language, and the document may include blocks of text in different languages. As a result of the deep analysis of each sentence in the document, the system can visually show to the user the words, phrases, sentences, and paragraph where the ambiguity has been located. By revealing the ambiguity, the user may be to prevent mistakes that might arise. For example, when translating the document to a foreign language, the user may detect errors in interpretation that caused the ambiguity.

In addition, this invention may be used for machine translation of text. A detailed description of various machine translation methods may be found in the following applications: Ser. No. 12/187,131, entitled A METHOD FOR TRANSLATING DOCUMENTS FROM ONE LANGUAGE INTO ANOTHER USING A DATABASE OF TRANSLATIONS, A TERMINOLOGY DICTIONARY, A TRANSLATION DICTIONARY, AND A MACHINE TRANSLATION SYSTEM; and Ser. No. 13/477,021, entitled METHOD AND SYSTEM FOR TRANSLATING SENTENCES BETWEEN LANGUAGES.

Many machine translation systems provide one possible version of the translation of a sentence or phrase, allowing one to look at and change the translation for individual words. However, in an illustrative embodiment, the user is given access to alternative translations of an overall sentence when several alternative translations of the sentence are possible due to an ambiguity. The translations may correspond to entirely different meanings for the sentence and may have different semantic and syntactic structures. The depiction of multiple alternative translations for an entire sentence is particularly useful for users who are not native speakers.

Figure 16:
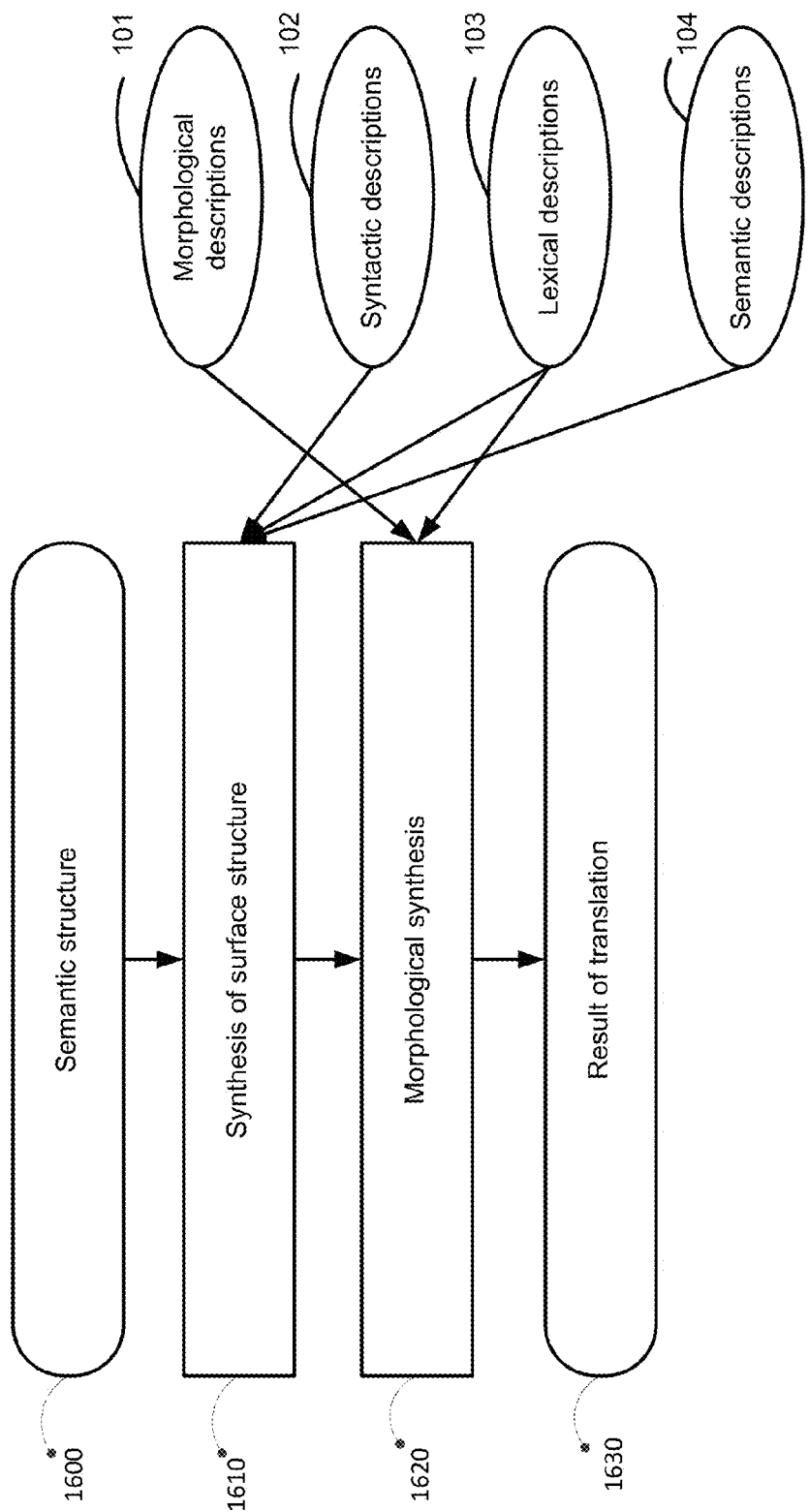
FIG. 16 shows a diagram of synthesis of a translation and the use of a universal semantic hierarchy in accordance with an illustrative embodiment of the disclosure.

Thus, at the stage where a translation is put together based on the constructed semantic structures, several alternative translations can be formed, each of which will be accessible to the user as possible additional proposed alternative translations. FIG. 16 shows a block diagram that illustrates an algorithm for synthesizing a translation based on the semantic structures constructed.

Figure 14:
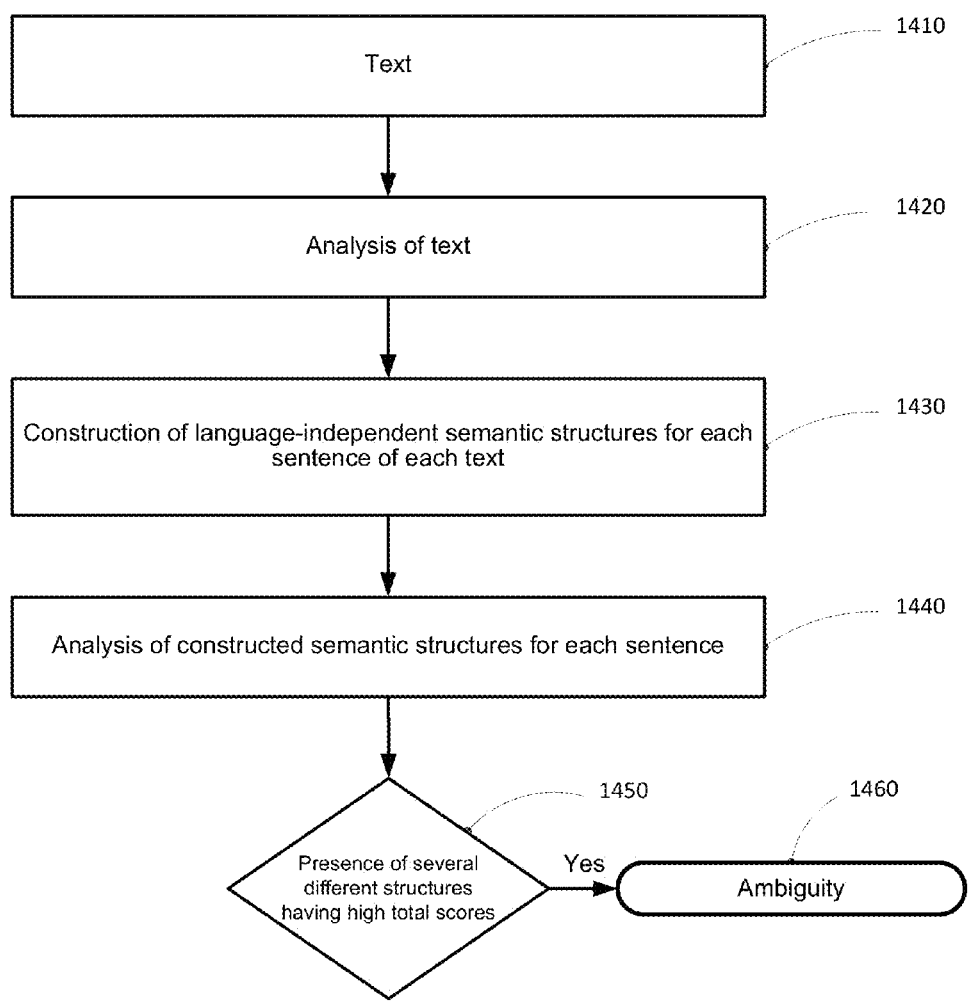
FIG. 14 shows a flowchart of operations for analyzing a document for sentences with several interpretations in accordance with an illustrative embodiment of the disclosure.

FIG. 14 shows a block diagram in accordance with an illustrative embodiment of the invention. At stage 1410, the system receives a document or text as input, which may contain sentences or phrases with ambiguity. Such a "text" may encompass any documents with characters or symbols, including hieroglyphics. If the text is represented in an uneditable format, the document(s) may be first recognized using Optical (or Intellectual) recognition engines.

In stage 1420, a deep analysis of the text is performed, including lexical-morphological, syntactic and/or semantic analysis. The process of performing a deep analysis of a sentence is discussed in detail above. Additionally, a detailed description of a system capable of performing deep analysis is shown in U.S. Pat. No. 8,078,450: METHOD AND SYSTEM FOR ANALYZING VARIOUS LANGUAGES AND CONSTRUCTING LANGUAGE-INDEPENDENT SEMANTIC STRUCTURES.

During stage 1420, the deep analysis that is performed may include a rough syntactic analysis, and a precise syntactic analysis. Graphs of generalized constituents are constructed and syntactic and semantic trees are built using the constituents. The syntactic trees with the highest overall ratings are considered the best representative trees, or in other words, the most probable trees. However, there may be trees in the set of structures produced from deep analysis that do not differ significantly from the most probable tree, yet still have different structures, different probabilities, non-tree links (relationships), and other features. These additional structures may depict an additional (hidden, less frequently used, etc.) meaning for a sentence. These additional structures may be taken into account and processed during further analysis.

For example, a syntactic ambiguity in the text may be analyzed. The syntactic ambiguity may be found at the syntactic analysis stage at step 1420. In other words, at the syntactic analysis stage, there may be syntactic trees constructed that have a different structure but have high overall ratings anyway, differing by some value Δ.

At the semantic analysis stage (1430), semantic structures are constructed based on the best syntactic structures. The semantic structures are language-independent and represent the meaning of the source sentence. If several highly probable candidates were found at the stage of construction of syntactic structures, then several semantic structures will be constructed based on these syntactic structures. The presence of several probable syntactic structures (and corresponding semantic structures) is an indicator of semantic ambiguity in the text.

The semantic structures are further analyzed at stage 1440. For example, measures of similarity or difference between semantic structures may be computed using the formulas described above. If there are several different structures with high overall ratings for parallel sentences in parallel texts, i.e., if the structures differ for sentences that are parallel according to the alignment (1450), then that may serve as an indicator that there is ambiguity in the sentence (1460).

Figures 15C, 15D:
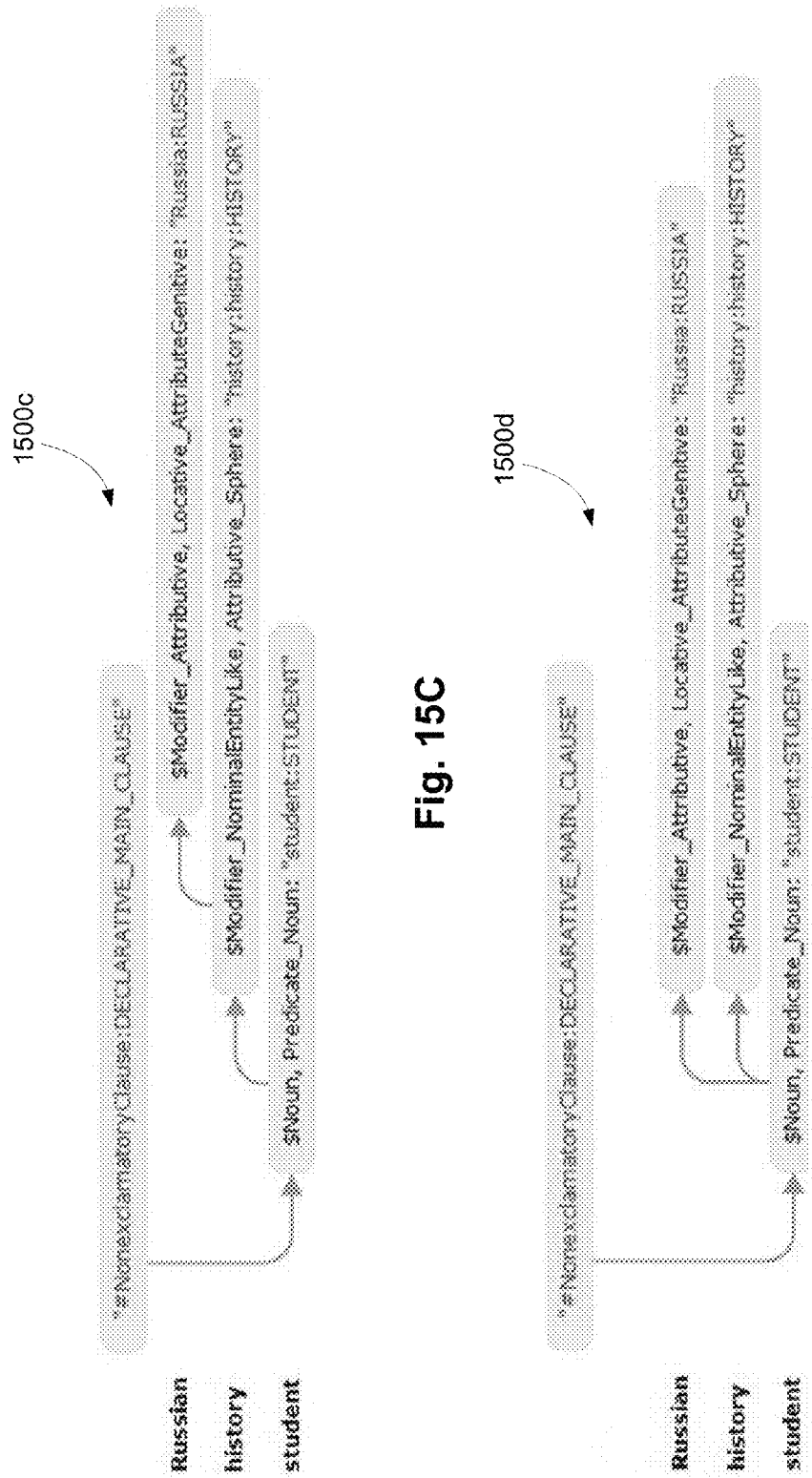

An example of a syntactic ambiguity is the following phrase: "THE RUSSIAN HISTORY STUDENT," which may be treated as "THE (RUSSIAN HISTORY) STUDENT," i.e., "THE STUDENT WHO IS STUDYING RUSSIAN HISTORY" or "THE RUSSIAN (HISTORY STUDENT)", i.e., "THE RUSSIAN STUDENT WHO IS STUDYING HISTORY." FIGS. 15A and 15B show examples of the syntactic trees 1500a and 1500b constructed for English that reflect the syntactic relationships in the phrases. According to FIG. 15A, the adjective "Russian," which pertains to the lexical item "Russia:RUSSIA" with deep slot "Locative_AttributeGenitive," depends on the noun "history", while the noun "history" is itself dependent on the noun "student." According to the second interpretation, whose syntactic tree is shown in FIG. 15B, the adjective "Russian" and the noun "history" relate to the noun "student." Because both syntactic trees have high overall ratings but different structures, which shows that the source sentence has syntactic ambiguity. Because the syntactic structures differ, the semantic structures constructed for each syntactic tree separately will differ as well. These semantic structures 1500c and 1500d are shown in FIGS. 15C and 15D. Thus at the stage of synthesizing the translation (e.g., the block diagram shown in FIG. 14) which is based on the semantic structures, the translation into Russian according to the first syntactic structure will be "СТУДЕНТ, ИЗУЧАЮЩИЙ РУССКУЮ ИСТОРИЮ" or in German as "EIN STUDENT, DER DIE RUSSISCHE GESCHICHTE LERNT." According to the second syntactic structure, the translation into Russian language will be "

РУССКИЙ СТУДЕНТ, ИЗУЧАЮЩИЙ ИСТОРИЮ" or the translation into German "EIN RUSSISCHER STUDENT, DER DIE GESCHICHTE LERNT".

Another example of syntactic ambiguity is the phrase "temporary and part-time employees". Based on the first most probable semantic structure, the translation may be "временно нанятые сотрудники" and "сотрудники, нанятые на неполный рабочий день" ("employees who are temporary, or employees who are part-time"). Based on the second semantic structure, the translation into the Russian language will be "сотрудники, которые наняты временно на неполный рабочий день" ("employees, each of whom is both temporary and part-time"). In this example, the noun "employee" may be allowed, to which the adjective (one of multiple ones of the same type) "temporary" may relate. This type of coordinating link in a phrase may be the subject of an elliptical link.

FIG. 16 shows the block diagram for synthesis of the translation. According to this block diagram, the translation is executed on the basis of semantic structures (1600). Surface structures are constructed later at stage 1610, and synthesis of the surface structures is based on the syntactic (102), lexical (103) and semantic (104) descriptions. After the semantic structures are formed, morphological analysis (1620) is done based on morphological (101) and lexical (103) descriptions. As a result, the user is shown the result of the translation at step 1630.

As was discussed above, an example of a sentence that contains a syntactic ambiguity is "THE POLICE SHOT THE RIOTERS WITH GUNS." FIGS. 9A and 9B show the two syntactic trees with the highest overall ratings. In FIG. 9A, the analysis illustrates that the noun "gun" of the Lexical Class (LK) "ARTILLERY_AS_WEAPON" is dependent on the noun "rioters" of the Lexical Class "RIOTERS." In FIG. 9A, this dependence is shown using arrow 901. FIG. 9B shows a second syntactic tree in which the noun "gun" of the Lexical Class "ARTILLERY_AS_WEAPON" depends on the verb "shoot" of the Lexical Class "TO_KILL_BY_SHOOTING." In FIG. 9B, this dependence is reflected by arrow 903. The semantic structures are constructed based on the syntactic trees created that correspond to them. The result is that the semantic structures needed for the translation synthesis stage will also differ, depicting a different meaning in the source sentence. So at the stage where a translation into Russian is synthesized according to FIG. 16, the following alternative translations are formed. The first variation of the translation based on the first semantic structure will be "ПОЛИЦИЯ ЗАСТРЕЛИЛА ТЕРРОРИСТОВ С ОРУЖИЕМ." According to the second semantic structure, the translation will be different—"ПОЛИЦИЯ ЗАСТРЕЛИЛА ТЕРРОРИСТОВ ИЗ ОРУЖИЯ." This example shows that the semantic structures will differ for different syntactic structures, and that consequently the translation alternatives that are synthesized based on these semantic structures will differ. Thus, one can conclude from this that the source sentence "THE POLICE SHOT THE RIOTERS WITH GUNS" contains an ambiguity and that according to the invention disclosed herein, an ambiguity of this type can be discovered in the text.

There are numerous examples of syntactic ambiguity. Another example is shown by the following phrase: "THE YOUNG MEN AND WOMEN LEFT THE ROOM." This phrase may be treated as "THE (YOUNG MEN) AND WOMEN" or "THE YOUNG (MEN AND WOMEN)." Depending on the noun to which the adjective "young" relates, the semantic structures will differ and consequently there will be different alternative translations into the target language. This phrase can also be the subject of non-referential links, particularly ellipsis. Ambiguities of this type, specifically phrases containing the conjunctions "or" or "and," are found particularly frequently in court and other legal documents, and finding and resolving these ambiguities is particularly important.

In accordance with an illustrative embodiment of the invention, the following examples of ambiguity can be detected. "HE GAVE HER CAT FOOD." This sentence has varying semantic structures, which can be used as the basis to form alternative Russian translations: «ОН ДАЛ ЕЙ КОШАЧЬЕЙ ЕДЫ» or «ОН ДАЛ ЕЕ КОШКЕ ЕДЫ». The sentence "HE SAW JANE COMING TO THE BANK" has four variations for semantic structures with the highest overall rating: "ОН УВИДЕЛ ДЖЕЙН, ИДУЩЕЙ В БАНК"; "ОН УВИДЕЛ ДЖЕЙН, ИДУЩЕЙ К БЕРЕГУ"; "ИДЯ В БАНК, ОН УВИДЕЛ ДЖЕЙН"; and "ИДЯ К БЕРЕГУ, ОН УВИДЕЛ ДЖЕЙН".

According to an alternative embodiment of this invention, parallel texts in different languages can be input. These texts may be a translation of one source document. For example, these documents may be court documents, agreements, or licenses in various languages. A situation may arise in which a sentence or phrase in the text may be differently interpreted. As a result, the source document and its translations into foreign languages may convey different meanings.

In another illustrative embodiment, parallel text corpora and translation memory (which can be obtained from outside sources) may be input to the system. In this embodiment, prior to using a corpus for analysis, such as for training, it is first necessary to check the quality of the corpus. Specifically before anything else, it is necessary to check whether it is properly aligned (i.e., check several sentences from one language as to whether the meaning matches for their counterparts based on the alignment of the sentences in the other language).

Figure 17:
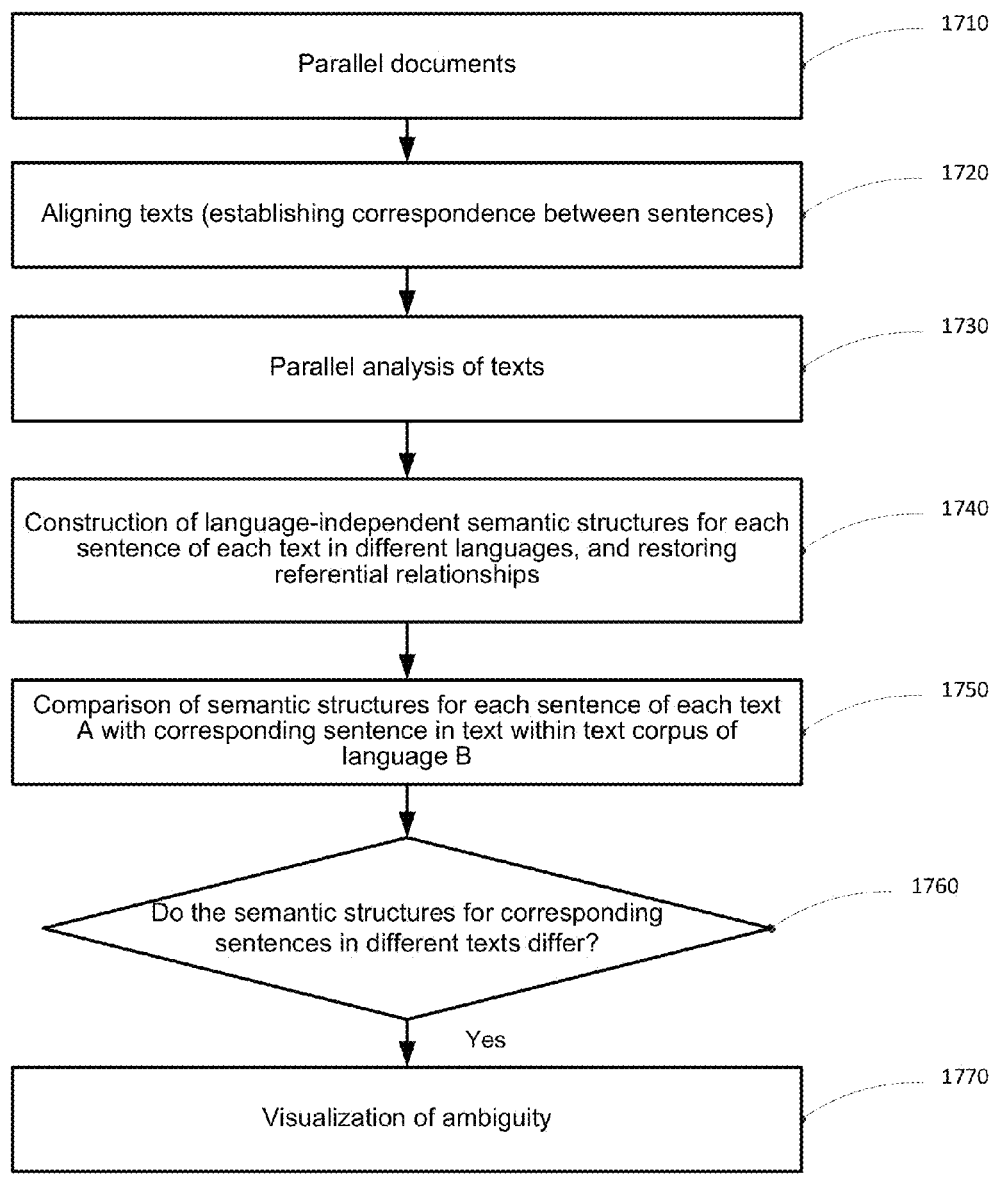
FIG. 17 shows a flowchart of operations for analyzing parallel documents for sentences with several interpretations in accordance with an illustrative embodiment of the disclosure.

FIG. 17 shows a block diagram for an alternative application under which at stage 1710, parallel text corpora or parallel documents, i.e., translation of one source document into various languages, are received by the system. These parallel texts are analyzed and sentences with ambiguities may be found. In this case, they may be already-aligned parallel texts or texts that have not undergone alignment.

Later at stage 1720, the correspondences between the sentences and paragraphs in the parallel texts are established by aligning the sentences. One of the existing alignment algorithms may be used to do that. For example, texts may be aligned as described in application Ser. No. 12/708,337 "METHODS AND SYSTEMS FOR ALIGNMENT OF PARALLEL TEXT CORPORA."

After alignment, each of the parallel documents is processed independently by the system 1730. Specifically, for each of the parallel documents, a deep analysis consisting of lexical-morphological, syntactic and semantic analysis is done independently for each sentence in the document as described above.

The deep analysis results in construction of syntactic structures, which are used as a basis for forming language-independent semantic structures (stage 1740) for each sentence in each parallel text (e.g., each text in different languages). In addition, referential relationships are restored at the semantic analysis stage. One example of referential links is an anaphora. Resolution of anaphoras in machine translation is typically a labor-intensive task. However, even in manual translation of text, some anaphoric links may be improperly traced, resulting in distortion of the meaning of the sentence. The method described allows following anaphoric links, both in the source text and the translated text. If it is found that the corresponding links in the parallel texts differ, that may indicate that the sentence has an ambiguity that was improperly interpreted during translation.

Thus, after the lexical-morphological, syntactic, and semantic analysis stages are complete, that is, in the final stage for each sentence in each text for the various languages, language-independent semantic structures are constructed reflecting the initial meaning. At stage 1750 (FIG. 17), the syntactic structures are compared for the sentences that correspond to them based on the alignment results. In other words, at this stage of comparison, a relationship is established between the semantic structure of the sentence in the language-A text and the corresponding sentence in the language-B text, etc. If it turns out that the semantic structures differ, the sentence is considered to contain ambiguity.

If it is found that the semantic structures differ (stage 1760), it is assumed that there is ambiguity in the source sentence. The presence of ambiguity may be visualized (stage 1770) using one of the known methods. Construction of missing additional semantic structures found during the analysis is recommended. Additionally, a translation may be made based on the semantic structures.

Referring to FIGS. 18A and 18B, an example of ambiguity in interpretation may be seen in the sentence: "Chickens are ready for dinner." For example, a translation of this sentence into Russian as "Куры готовы поесть" was made in the parallel document. In accordance with the method described for finding ambiguity, this sentence is carefully studied; specifically, a deep analysis is done and syntactic and semantic structures are constructed for each sentence. Thus the semantic structure (1800a) found for the English sentence "Chickens are ready for dinner" is shown in FIG. 18A. In this semantic structure, the noun "chickens" relates to the lexical item "CHICKEN_MEAT" with deep slot "Experiencer_Metaphoric." The semantic structure (1800b) for the Russian sentence "Куры готовы пообедать" is shown in FIG. 18B. According to this semantic structure, the noun "куры" relates to the Lexical Class "HEN_ROOSTER" with deep slot "Experiencer." It is clear from doing parallel analysis of the texts that the semantic structures differ. The differing semantic structures for the parallel sentences indicate that there is an ambiguity in interpretation in the source sentence.

Figure 19:
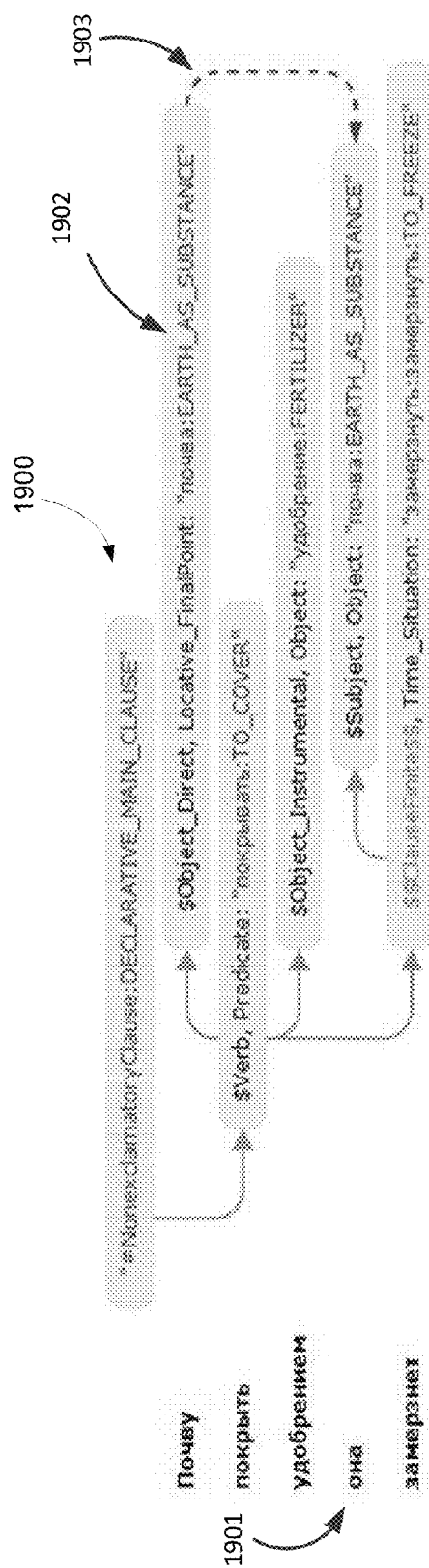
FIG. 19 shows a diagram of a tree for Russian sentences "ПОЧВУ НУЖНО ПОКРЫТЬ УДОБРЕНИЕМ, ПРЕЖДЕ ЧЕМ ОНА ЗАМЕРЗНЕТ" in accordance with an illustrative embodiment of the disclosure.

Another example of ambiguity may be seen in the sentence: "THE SOIL SHALL BE COVERED BY FERTILIZER BEFORE IT FREEZES". Suppose we have three sentences in three different languages. One sentence is the source English sentence, which contains ambiguity. Two other sentences might be the translations into Russian and German respectively. If people or a machine translation system made the translation and the ambiguity in the source English sentence was not identified, the result is the formation of sentences that differ in meaning. The ambiguity in the source English sentence is that the pronoun "it" may relate either to the noun "soil" or to the noun "fertilizer." For this reason, the translations to the target languages, such as Russian or German, will differ depending on what word the pronoun "it" relates to, and the meaning of the translated sentence will differ as a result. Similar sentences may be understood differently by different translators, so the translations will differ. In a similar situation, similar sentences will be visualized as sentences containing ambiguity. For example, during translation the pronoun "it" may be related to the noun "soil." As a result, the translation into Russian (using the algorithm shown in FIG. 16) will be "В ПОЧВУ НУЖНО ВНЕСТИ УДОБРЕНИЕ, ПРЕЖДЕ ЧЕМ ОНА ЗАМЕРЗНЕТ." At the same time, the pronoun "it" may be related to the noun "fertilizer" and as a result, the German translation obtained was "DER BODEN SOLLTE MIT DÜNGEMITTEL ABGEDECKT WERDEN, BEVOR ES FRIERT." In accordance with the invention, for each sentence in the Russian and the German alternative translations, semantic structures were constructed reflecting the varying dependences shown as non-tree links. An example of a semantic structure (1900) for the Russian version of the translation is shown in FIG. 19, reflecting that the pronoun "она" (1901) depends on the noun "почва," Lexical Class EARTH_AS_SUBSTANCE (1902) as a non-tree link (1903). At the same time, the semantic structure for the version of the German translation shows that the pronoun "Es" depends on the noun "Düngemittel." Thus, the example demonstrates that the source sentence in English contains an ambiguity shown as a referential link—an anaphora. This type of ambiguity is caused by asymmetry in the languages. For example, in English for the pronoun "it" as referring to inanimate objects, Russian has the pronouns "он," "она" and "оно." Out of context, and if the dependence of this pronoun on an antecedent is ambiguous, it is hard to properly translate the sentence. The system described helps to find a similar ambiguity in the text and show it to the user. An ambiguity caused by improper punctuation in the sentence may also be found at the syntactic analysis stage. Lexical ambiguity, which consists of a word having several lexical meanings, may also be found at the lexical analysis stage.

Figure 20:
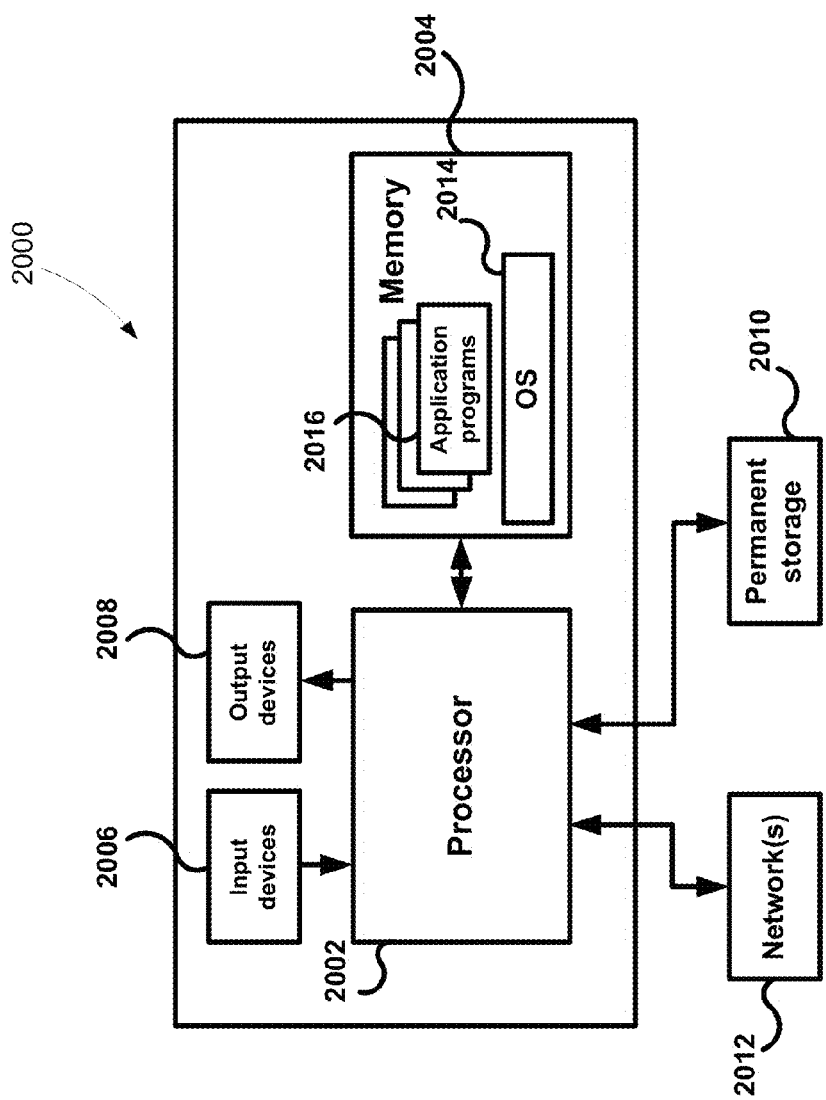
FIG. 20 shows a diagram of a computing system in accordance with an illustrative embodiment.

FIG. 20 shows a diagram of a computing system, including hardware 2000 that may be used to implement this invention. The hardware 2000 includes at least one processor 2002 connected to a memory 2004. The processor 2002 may be one or more processors, may contain one, two, or more computer cores or may be a chip or other device capable of doing computation, or may be any commercially available CPU. The memory 2004 may represent random access memory (RAM) devices comprising a main storage of the hardware 2000, as well as any supplemental levels of memory, e.g., cache memories, non-volatile or back-up memories (e.g., programmable or flash memories), read-only memories, etc. In addition, the memory 2004 may be considered to include memory storage physically located elsewhere in the hardware 2000, e.g., any cache memory in the processor 2002 as well as any storage capacity used as a virtual memory, e.g., as stored on a mass storage device 2010 (e.g., an external or internal permanent memory device).

The hardware (2000) also usually has a certain number of input and output ports to transfer information out and receive information. For interface with a user or operator, the hardware (2000) may contain one or more input devices (2006) (e.g., a keyboard, a mouse, an imaging device, a scanner, or other) and one or more output devices (2008) (e.g., a Liquid Crystal Display (LCD) panel, a sound playback device (speaker).

For additional storage, the hardware 2000 may also have one or more mass storage devices 2010, e.g., floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware 2000 may have an interface with one or more networks 2012 (e.g., a local area network (LAN), a wide area network (WAN), a wireless network, and/or the Internet among others) to permit the communication of information with other computers coupled to the networks. In particular, this may be a local area network (LAN) or a wireless Wi-Fi network, and may or may not be joined to the World-Wide Web (Internet). It should be appreciated that the hardware 2000 typically includes suitable analog and/or digital interfaces between the processor 2002 and each of the components 2004, 2006, 2008, 2010 and 2012, as is well known in the art.

The hardware 2000 operates under the control of an operating system 2014, and executes various computer software applications components, programs, objects, modules, etc. to implement the techniques described above. In particular, the computer software applications will include the language ambiguity detection application, and may include a client dictionary application, a translation application, and also other installed applications for displaying text and/or text image content such a word processor, etc. Moreover, various applications, components, programs, objects, etc., collectively indicated by reference 2016 in FIG. 20, may also execute on one or more processors in another computer coupled to the hardware 2000 via a network 2012, e.g., in a distributed computing environment, whereby the processing required to implement the functions of a computer program may be allocated to multiple computers over a network.

In general, the routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain illustrative embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method of detecting a semantic ambiguity, comprising:

analyzing, using one or more processors, a first sentence of a first natural language text to identify syntactic relationships among constituents of the first sentence;

forming a graph of the constituents of the first sentence based on the syntactic relationships and a lexical-morphological structure of the first sentence;

analyzing the graph to produce a plurality of syntactic structures representing the first sentence;

determining semantic structures corresponding to the syntactic structures;

selecting a first and a second semantic structure among the semantic structures, wherein each of the first and second semantic structures is associated with a corresponding syntactic structure having a rating exceeding a threshold value;

determining a difference between the first and second semantic structures by computing a function of a sum of differences of pairs of semantic classes, such that a first semantic class of each pair belongs to the first semantic structure and a second semantic class of the pair belongs to the second semantic structure;

identifying a semantic ambiguity in the first sentence based on the difference between the first and second semantic structures;

generating a first translation of the first sentence and a second translation of the first sentence based on the semantic ambiguity; and presenting the first translation and the second translation via a user interface.

2. The method of claim 1, wherein the semantic structures are language-independent and represent a meaning of the first sentence.

3. The method of claim 1, further comprising:

identifying, in a second natural language text, a second sentence corresponding to the first sentence of the first natural language text, wherein the second natural language text is a language translation of the first natural language text;

determining semantic structures corresponding to the second sentence;

determining a difference between the semantic structures corresponding to the first sentence and the semantic structures corresponding to the second sentence; and identifying a semantic ambiguity in the first sentence based on the difference between the semantic structures corresponding to the first sentence and the semantic structures corresponding to the second sentence.

4. The method of claim 1, further comprising visually marking the semantic ambiguity in the sentence using a graphical user interface.

5. The method of claim 4, wherein visually marking the semantic ambiguity in the sentence includes showing at least one of a specific word, sentence, phrase, or paragraph associated with the semantic ambiguity.

6. The method of claim 1, wherein nodes of the graph store alternative lexical values for words of the first sentence, and wherein edges of the graph express relationships between the lexical values.

7. The method of claim 1, wherein the graph represents the first sentence in its entirety.

8. A system for detecting semantic ambiguity, the system comprising one or more processors configured to:
analyze a first sentence of a first natural language text to determine syntactic relationships among constituents of the sentence;
form a graph of the constituents of the first sentence based on the syntactic relationships and a lexical-morphological structure of the first sentence;
analyze the graph to produce a plurality of syntactic structures representing the first sentence;
associate each syntactic structure of the plurality of syntactic structures with a rating indicative of a probability of the syntactic structure representing a full syntactic structure of the first sentence;
determine semantic structures corresponding to the syntactic structures;
select a first and a second semantic structure among the semantic structures, wherein each of the first and second semantic structures is associated with a corresponding syntactic structure having a rating exceeding a threshold value;
determine a difference between the first and second semantic structures by computing a function of a sum of differences of pairs of semantic classes, such that a first semantic class of each pair belongs to the first semantic structure and a second semantic class of the pair belongs to the second semantic structure; and
identify a semantic ambiguity in the first sentence based on the difference between the first and second semantic structures;
generate a first translation of the first sentence and a second translation of the first sentence based on the semantic ambiguity; and
present the first translation and the second translation via a user interface.

9. The system of claim 8, wherein the semantic structures are language-independent and represent a meaning of the first sentence.

10. The system of claim 8, wherein the one or more processors are further configured to:
identify, in a second natural language text, a second sentence corresponding to the first sentence of the first natural language text, wherein the second natural language text is a language translation of the first natural language text;
determine semantic structures corresponding to the sentence of the second text;
determine a difference between the semantic structures corresponding to the first sentence and the semantic structures corresponding to the second sentence; and
identify a semantic ambiguity in the first sentence based on the determined difference between the semantic structures corresponding to the first sentence and the semantic structures corresponding to the second sentence.

11. The system of claim 8, wherein the one or more processors are further configured to cause a graphical user interface to visually mark the semantic ambiguity in the sentence.

12. The system of claim 8, wherein nodes of the graph store alternative lexical values for words of the first sentence, and wherein edges of the graph express relationships between the lexical values.

13. A non-transitory computer-readable storage medium having instructions stored thereon, that when executed by a processor, cause the processor to:
analyze a first sentence of a first natural language text to identify syntactic relationships among constituents of the first sentence;
form a graph of the constituents of the first sentence based on the syntactic relationships and a lexical-morphological structure of the first sentence;
instructions to analyze the graph to produce a plurality of syntactic structures representing the first sentence;
associate each syntactic structure of the plurality of syntactic structures with a rating indicative of a probability of the syntactic structure representing a full syntactic structure of the first sentence;
determine semantic structures corresponding to the syntactic structures;
select a first and a second semantic structure among the semantic structures, wherein each of the first and second semantic structures is associated with a corresponding syntactic structure having a rating exceeding a threshold value;
determine a difference between the first and second semantic structures by computing a function of a sum of differences of pairs of semantic classes, such that a first semantic class of each pair belongs to the first semantic structure and a second semantic class of the pair belongs to the second semantic structure; and
identify a semantic ambiguity in the first sentence based on the difference between the first and second semantic structures;
generate a first translation of the first sentence and a second translation of the first sentence based on the semantic ambiguity; and
present the first translation and the second translation via a user interface.

14. The non-transitory computer-readable storage medium of claim 13, further comprising executable instructions that when executed by the processor, cause the processor to:
identify, in a second natural language text, a second sentence corresponding to the first sentence of the first natural language text, wherein the second natural language text is a language translation of the first natural language text;
determine semantic structures corresponding to the second sentence;
determine a difference between the semantic structures corresponding to the first sentence and the semantic structures corresponding to the second sentence; and
identify a semantic ambiguity in the first sentence based on the determined difference between the semantic structures corresponding to the first sentence and the semantic structures corresponding to the second sentence.

15. The method of claim 1, wherein the sum of differences of pairs of semantic classes is normalized by a product of a first cardinality of a first set of semantic classes of the first semantic structure and a second cardinality of a second set of semantic classes of the second semantic structure.

16. The method of claim 15, wherein the first cardinality is different from the second cardinality.

17. The method of claim 1, wherein the rating is indicative of a probability of the selected syntactic structure representing the first sentence.

* * * * *